US010609691B2

(12) United States Patent
Nakamura et al.

(10) Patent No.: US 10,609,691 B2
(45) Date of Patent: Mar. 31, 2020

(54) TERMINAL DEVICE AND BASE STATION DEVICE

(71) Applicant: Sharp Kabushiki Kaisha, Osaka-shi, Osaka (JP)

(72) Inventors: Osamu Nakamura, Osaka (JP); Jungo Goto, Osaka (JP); Daiichiro Nakashima, Osaka (JP); Yasuhiro Hamaguchi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/107,516

(22) PCT Filed: Dec. 26, 2014

(86) PCT No.: PCT/JP2014/084689
§ 371 (c)(1),
(2) Date: Jun. 23, 2016

(87) PCT Pub. No.: WO2015/099173
PCT Pub. Date: Jul. 2, 2015

(65) Prior Publication Data
US 2016/0323855 A1 Nov. 3, 2016

(30) Foreign Application Priority Data

Dec. 27, 2013 (JP) ................................ 2013-270703
Jan. 31, 2014 (JP) ................................ 2014-016279

(51) Int. Cl.
*H04W 72/04* (2009.01)
*H04L 1/00* (2006.01)
(Continued)

(52) U.S. Cl.
CPC ........... *H04W 72/042* (2013.01); *H04L 1/001* (2013.01); *H04L 1/0003* (2013.01);
(Continued)

(58) Field of Classification Search
None
See application file for complete search history.

(56) References Cited

U.S. PATENT DOCUMENTS 9,210,693 B2 * 12/2015 Zhang ....................... H04L 1/00
9,407,417 B2   8/2016 Chen et al.
(Continued)

FOREIGN PATENT DOCUMENTS

EP    2 639 983 A1    9/2013
WO   2014/109915 A1   7/2014
(Continued)

OTHER PUBLICATIONS

Official Communication issued in International Patent Application No. PCT/JP2014/084689, dated Mar. 17, 2015.
(Continued)

*Primary Examiner* — Kodzovi Acolatse
(74) *Attorney, Agent, or Firm* — Keating & Bennett, LLP

(57) ABSTRACT

Selection of a suitable MCS improves throughput without increasing the number of pieces of control information. Provided is a terminal apparatus including: a control information extraction unit 703 that receives control information for requesting a CSI notification; a CQI determination unit 707 that calculates CQI according to the control information and calculates a CQI index by any CQI table of a first CQI table and a second subframe from the CQI; and a UL transmission unit 711 that performs uplink transmission of the CQI index to a base station apparatus, in which, in a case where the control information is received on a first downlink subframe set, the CQI determination unit 707 generates the CQI index using the first CQI table, and in which, in a case where the control information is received on a second downlink subframe set, the CQI determination unit 707 generates the CQI index using the second CQI table.

12 Claims, 18 Drawing Sheets

(51) Int. Cl.
*H04L 5/00* (2006.01)
*H04L 27/34* (2006.01)

(52) U.S. Cl.
CPC .......... *H04L 1/0004* (2013.01); *H04L 1/0016* (2013.01); *H04L 1/0026* (2013.01); *H04L 1/0028* (2013.01); *H04L 5/0053* (2013.01); *H04L 27/3461* (2013.01); *H04L 5/0073* (2013.01); *H04L 27/34* (2013.01)

(56) References Cited

U.S. PATENT DOCUMENTS

| | | | |
|---|---|---|---|
| 9,432,168 B2 | 8/2016 | Kim et al. | |
| 9,832,784 B2 | 11/2017 | Einhaus et al. | |
| 10,015,031 B2 | 7/2018 | Yi et al. | |
| 10,116,414 B2 | 10/2018 | Kim et al. | |
| 10,257,841 B2 | 4/2019 | Li et al. | |
| 2014/0169297 A1* | 6/2014 | Kim | H04L 5/0092 370/329 |
| 2014/0169300 A1* | 6/2014 | Kim | H04L 5/0057 370/329 |
| 2014/0192732 A1 | 7/2014 | Chen et al. | |
| 2015/0016553 A1* | 1/2015 | Yang | H04L 1/0016 375/261 |
| 2015/0085767 A1* | 3/2015 | Einhaus | H04L 1/0001 370/329 |
| 2015/0117568 A1* | 4/2015 | Wang | H04L 27/0008 375/298 |
| 2015/0124663 A1* | 5/2015 | Chen | H04L 5/0053 370/278 |
| 2015/0195068 A1* | 7/2015 | Kim | H04L 5/0048 370/329 |
| 2015/0249564 A1* | 9/2015 | Kim | H04L 5/0007 370/329 |
| 2015/0358111 A1 | 12/2015 | Marinier et al. | |
| 2015/0382328 A1* | 12/2015 | Jiang | H04L 1/0004 370/329 |
| 2016/0057735 A1* | 2/2016 | Liu | H04L 1/0003 370/329 |
| 2016/0211904 A1* | 7/2016 | Kim | H04L 27/34 |
| 2016/0219600 A1* | 7/2016 | Li | H04W 72/1231 |
| 2016/0249244 A1 | 8/2016 | Xia et al. | |
| 2016/0261393 A1 | 9/2016 | Chen et al. | |
| 2016/0294593 A1 | 10/2016 | Yi et al. | |
| 2016/0337073 A1 | 11/2016 | Kim et al. | |
| 2018/0324015 A1 | 11/2018 | Yi et al. | |
| 2018/0332597 A1 | 11/2018 | Li et al. | |

FOREIGN PATENT DOCUMENTS

| | | |
|---|---|---|
| WO | 2014/110467 A1 | 7/2014 |
| WO | 2015/034151 A1 | 3/2015 |
| WO | 2015/050416 A1 | 4/2015 |
| WO | 2015/062194 A1 | 5/2015 |
| WO | 2015/080532 A1 | 6/2015 |

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.3.0, Jun. 2013, pp. 1-84.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, pp. 1-176.

CATT, "Analysis on specification impact of higher order modulation", 3GPP TSG RAN WG1 Meeting #75, R1-135079, Nov. 11-15, 2013, 2 pages.

Panasonic, "Specification impact of introducing 256QAM", 3GPP TSG-RAN WG1 Meeting #75, R1-135395, Nov. 11-15, 2013, pp. 1-4.

Panasonic, "MCS Table Adaptation for Low Power ABS", 3GPP TSG-RAN WG1 Meeting 70bis, R1-124232, Oct. 8-12, 2012, pp. 1-7.

Samsung, "Discussion on specification impacts of 256QAM", 3GPP TSG RAN WG1 Meeting #75, R1-135208, Nov. 11-15, 2013, pp. 1-3.

Nakamura et al., "Terminal Device and Base Station Device," U.S. Appl. No. 15/107,510, filed Jun. 23, 2016.

Panasonic, "MCS Indication for 256QAM", 3GPP TSG-RAN WG1 Meeting 76bis, R1-141212, Mar. 31-Apr. 4, 2014, pp. 1-4.

* cited by examiner

FIG. 3

| CQI INDEX | MODULATION SCHEME | CODING RATE | FREQUENCY EFFICIENCY |
|---|---|---|---|
| 0 | OUT OF RANGE | | |
| 1 | QPSK | 0.0762 | 0.1523 |
| 2 | QPSK | 0.1172 | 0.2344 |
| 3 | QPSK | 0.1885 | 0.3770 |
| 4 | QPSK | 0.3001 | 0.6016 |
| 5 | QPSK | 0.4385 | 0.8770 |
| 6 | QPSK | 0.5879 | 1.1758 |
| 7 | 16QAM | 0.3691 | 1.4766 |
| 8 | 16QAM | 0.4785 | 1.9141 |
| 9 | 16QAM | 0.6016 | 2.4063 |
| 10 | 64QAM | 0.4551 | 2.7305 |
| 11 | 64QAM | 0.5537 | 3.3223 |
| 12 | 64QAM | 0.6503 | 3.9023 |
| 13 | 64QAM | 0.7539 | 4.5234 |
| 14 | 64QAM | 0.8525 | 5.1152 |
| 15 | 64QAM | 0.9258 | 5.5547 |

FIG. 4

| CQI INDEX | MODULATION SCHEME | CODING RATE | FREQUENCY EFFICIENCY |
|---|---|---|---|
| 0 | OUT OF RANGE | | |
| 1 | QPSK | 0.0762 | 0.1523 |
| 2 | QPSK | 0.1885 | 0.3770 |
| 3 | QPSK | 0.4385 | 0.8770 |
| 4 | 16QAM | 0.3691 | 1.4766 |
| 5 | 16QAM | 0.4785 | 1.9141 |
| 6 | 16QAM | 0.6016 | 2.4063 |
| 7 | 64QAM | 0.4551 | 2.7305 |
| 8 | 64QAM | 0.5537 | 3.3223 |
| 9 | 64QAM | 0.6503 | 3.9023 |
| 10 | 256QAM | 0.4883 | 4.2969 |
| 11 | 256QAM | 0.5859 | 4.6875 |
| 12 | 256QAM | 06836 | 5.4688 |
| 13 | 256QAM | 0.7813 | 6.2500 |
| 14 | 256QAM | 0.8789 | 7.0312 |
| 15 | 256QAM | 0.9766 | 7.8125 |

FIG. 5

| MCS INDEX | MODULATION SCHEME | TBS INDEX |
|---|---|---|
| 0 | QPSK | 0 |
| 1 | QPSK | 1 |
| ⋮ | ⋮ | ⋮ |
| 8 | QPSK | 8 |
| 9 | QPSK | 9 |
| 10 | 16QAM | 9 |
| 11 | 16QAM | 10 |
| ⋮ | ⋮ | ⋮ |
| 15 | 16QAM | 14 |
| 16 | 16QAM | 15 |
| 17 | 64QAM | 15 |
| 18 | 64QAM | 16 |
| ⋮ | ⋮ | ⋮ |
| 28 | 64QAM | 26 |
| 29 | QPSK | reserved |
| 30 | 16QAM | |
| 31 | 64QAM | |

FIG. 6

| MCS INDEX | MODULATION SCHEME | TBS INDEX |
|---|---|---|
| 0 | QPSK | 0 |
| ⋮ | ⋮ | ⋮ |
| 5 | QPSK | 5 |
| 6 | 16QAM | 5 |
| ⋮ | ⋮ | ⋮ |
| 11 | 16QAM | 10 |
| 12 | 64QAM | 10 |
| 13 | 64QAM | 11 |
| ⋮ | ⋮ | ⋮ |
| 16 | 64QAM | 14 |
| 17 | 256QAM | 14 |
| 18 | 256QAM | 15 |
| ⋮ | ⋮ | ⋮ |
| 28 | 256QAM | 25 |
| 29 | QPSK | reserved |
| 30 | 16QAM | |
| 31 | 64QAM | |

FIG. 8

| VALUE OF CSI REQUEST FIELD | DESCRIPTION |
|---|---|
| '00' | APERIODIC CSI DOES NOT OPERATE |
| '01' | APERIODIC CSI IS CAUSED TO OPERATE IN SERVICING CELL c |
| '10' | APERIODIC CSI IS CAUSED TO OPERATE IN CELL IN FIRST SET THAT IS CONFIGURED FROM HIGHER LAYER |
| '11' | APERIODIC CSI IS CAUSED TO OPERATE IN CELL IN SECOND SET THAT IS CONFIGURED FROM HIGHER LAYER |

FIG. 9

| VALUE OF CSI REQUEST FIELD | CELL SET AND MODULATION MODE | | | |
|---|---|---|---|---|
| '10' | CC# | 1 | – | 3 |
| | MODULATION MODE | 64QAM | – | 256QAM |
| '11' | CC# | – | 2 | 3 |
| | MODULATION MODE | – | 64QAM | 64QAM |

FIG. 10

| VALUE OF CSI REQUEST FIELD | CELL SET AND MODULATION MODE | | | |
|---|---|---|---|---|
| '10' | CC# | 1 | — | 3 |
| | MODULATION MODE | 64QAM | — | 256QAM |
| '11' | CC# | — | 2 | 3 |
| | MODULATION MODE | — | 64QAM | 256QAM |

FIG. 13

| PDCCH | MODULATION MODE |
|---|---|
| USS | OPERATION AS 256 QAM |
| CSS | OPERATION AS 64 QAM |

FIG. 14

| CQI INDEX | MODULATION SCHEME | CODING RATE | FREQUENCY EFFICIENCY |
|---|---|---|---|
| 0 | OUT OF RANGE | | |
| 1 | QPSK | 0.0762 | 0.1523 |
| 2 | 256QAM | 0.4883 | 4.2969 |
| 3 | QPSK | 0.1885 | 0.3770 |
| 4 | 256QAM | 0.5859 | 4.6875 |
| 5 | QPSK | 0.4385 | 0.8770 |
| 6 | 256QAM | 06836 | 5.4688 |
| 7 | 16QAM | 0.3691 | 1.4766 |
| 8 | 16QAM | 0.4785 | 1.9141 |
| 9 | 16QAM | 0.6016 | 2.4063 |
| 10 | 64QAM | 0.4551 | 2.7305 |
| 11 | 64QAM | 0.5537 | 3.3223 |
| 12 | 64QAM | 0.6503 | 3.9023 |
| 13 | 256QAM | 0.7813 | 6.2500 |
| 14 | 256QAM | 0.8789 | 7.0312 |
| 15 | 256QAM | 0.9766 | 7.8125 |

FIG. 17

| VALUE OF CSI REQUEST FIELD | DESCRIPTION |
|---|---|
| '00' | APERIODIC CSI DOES NOT OPERATE |
| '01' | APERIODIC CSI IS CAUSED TO OPERATE IN SERVICING CELL c |
| '10' | APERIODIC CSI IS CAUSED TO OPERATE IN CELLS (CC 1, CC 2, AND CC 3) IN FIRST SET |
| '11' | APERIODIC CSI IS CAUSED TO OPERATE IN CELLS (CC 1 AND CC 3) IN FIRST SET |

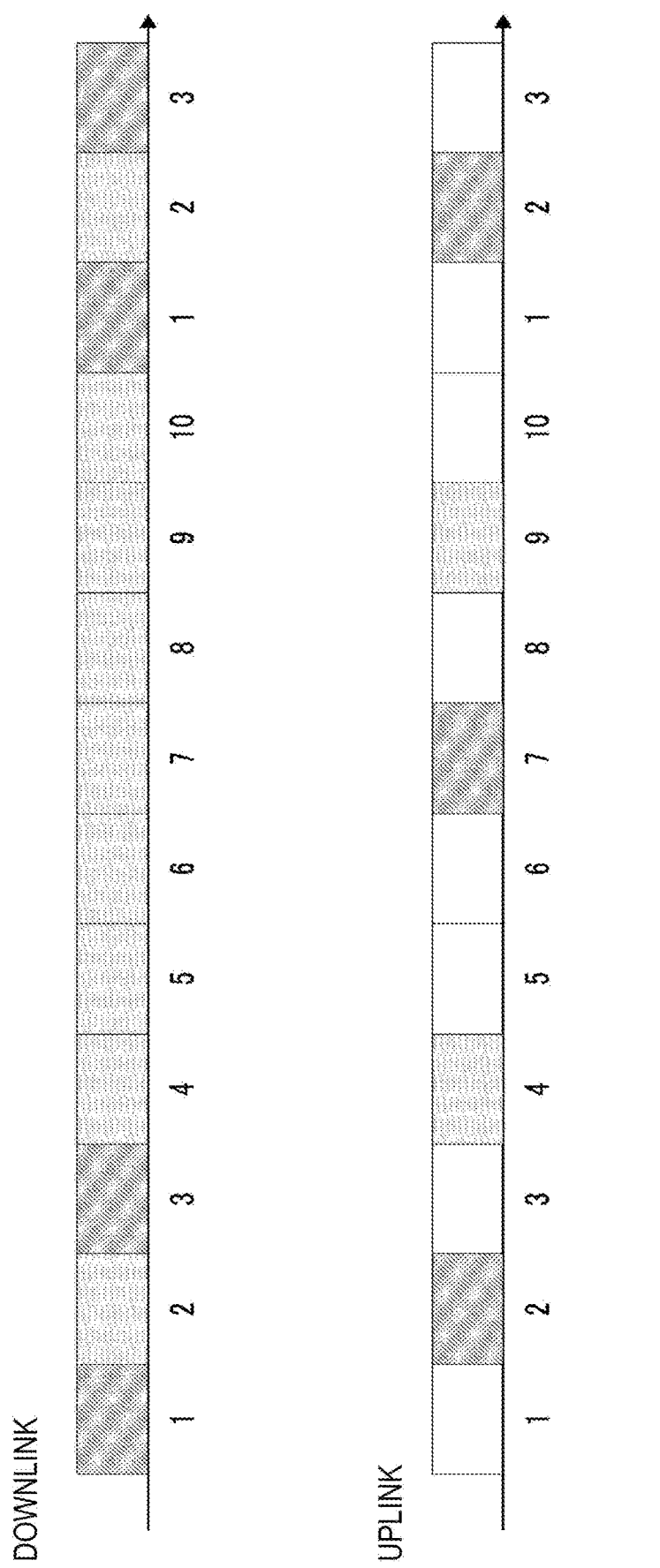

TERMINAL DEVICE AND BASE STATION DEVICE

TECHNICAL FIELD

The present invention relates to a terminal apparatus and a base station apparatus.

BACKGROUND ART

With the recent popularization of smart phones or the like, there is an increasing demand for high-speed wireless transfer. In the Third Generation Partnership Project (3GPP) that is one among standardization organizations, standardization for Long Term Evolution (LTE) has been performed. Currently, Release 11 (Rel-11) standardization has almost been finished, and Rel-12 standardization has been performed.

For downlink in LTE, as modulation schemes, Quadrature Phase Shift Keying (QPSK), Quadrature Amplitude Modulation (16 QAM), and 64 QAM are supported. While only two bits can be transmitted on one modulation symbol with QPSK, 4 bits can be transmitted with 16 QAM and 6 bits can be transmitted with 64 QAM. More precisely, 16 QAM has higher frequency efficiency than QPSK, and 64 QAM has higher frequency efficiency than 16 QAM. However, when a channel state is poor for a base station apparatus (an evolved Node B(eNB)) and a terminal apparatus (User Equipment (UE)), the greater the number of transmission bits on one modulation symbol, the more likely a bit error is to occur. Accordingly, in LTE, a technology is employed in which a modulation scheme is adaptively selected depending on a channel state between the eNB and the UE and which is referred to as an adaptive modulation. Moreover, in addition to the modulation scheme, a coding rate of an error correction code is also adaptively changed in LTE. For example, in LTE Frequency Division Duplex (FDD), the UE estimates a downlink channel state based on a reference signal that is transmitted by the base station apparatus, and notifies the eNB of Channel Quality Information (CQI) that is obtained. The eNB selects a modulation scheme that has the highest frequency efficiency from among combinations of the modulation schemes and the coding rates (Modulation and Coding Schemes (MCSs)) that have a prescribed error rate or less, using the notified CQI, and performs downlink transfer using the selected MCS. In this LTE, adaptive selection of the MCS depending on the channel state can realize high throughput.

Moreover, in standards up to and including the LTE Rel-11 standards, a technology that is referred to as Almost Blank Subframes (ABSs) is introduced. In this technology, a certain base station apparatus does not perform data transmission and the like on a prescribed subframe, or determines that the transmission has to be performed with a lowered power, and notifies neighbor base station apparatuses of information indicating the prescribed subframe. The neighbor base station apparatuses can perform downlink data transfer on the terminal apparatus that is under the control on a subframe on which a small amount of interference from a certain base station apparatus occurs.

Furthermore, in the Rel-12 standards, it is considered that in addition to the eNB in the related art, a pico base station (is referred to as a small cell) is arranged within a cell that is covered by the eNB. Moreover, the pico base station does not necessarily need to be equipped with a function as the base station, and may be configured as a forward-extending antenna (Remote Radio Head (RRH)). Because it is presupposed that multiple pico base stations are arranged within a cell and that sectoring is not performed, it is assumed that because interference between sectors does not occur and the like or for other reasons, a likelihood that a high Signal to Interference plus Noise power Ratio (SINR) will be obtained is higher since Rel-8. Accordingly, in 3GPP, the introduction of 256 QAM that enables 8-bit transmission on one symbol has been considered in addition to the introduction of QPSK, 16 QAM, and 64 QAM. With the introduction of 256 QAM, the UE that can receive data at a high SINR can further increase the throughput.

Incidentally, a value in a case where modulation schemes up to and including 64 QAM are assumed is defined for the CQI that the UE notifies the eNB (or the pico base station) of. For this reason, although the UE notifies the eNB of the greatest CQI, the eNB determines that the channel state is poor for transmitting data to the UE with 256 QAM, and regardless of an environment in which even though the transmission with 256 QAM is performed, the transfer can be performed without any error, the eNB is expected to transfer data using 64 QAM for the downlink. Furthermore, a channel that is referred to as a Physical Downlink Shared CHannel (PDSCH) is used for the data transfer for the downlink, but the MCS that is used on the PDSCH is notified using a channel that is referred to as a Physical Downlink Control CHannel (PDCCH), for transmission of control information. Nevertheless, because 256 QAM is not defined in the standards up to and including the Rel-11 standards, 256 QAM is difficult to configure on the PDCCH.

In this manner, with the CQIs and MCSs up to and including those in the Rel-11, it is difficult for the UE to make a request to the eNB for 256 QAM or it is difficult for the eNB to notify the UE that transfer with 256 QAM is performed. Accordingly, as disclosed in NPL 1 and NPL 2, in the standards up to and including the Rel-11 standards, the CQI and the MCS are defined with 4 bits and 5 bits, respectively, but because 256 QAM is supported, it is considered that an amount of information is increased by one bit for each of the CQI and the MCS, and thus, the CQI and the MCS are defined with 5 bits and 6 bits, respectively. Nevertheless, when the number of bits is increased, problems occur not only in that an increase in the control information decreases downlink throughput, but also in that an increase in the number of bits of the control information brings about the need to change a mechanism that is referred to as blind decoding that is performed on the control information.

Accordingly, in current 3GPP, as disclosed in NPL 3, it is proposed that a mode (hereinafter, referred to as a 64 QAM mode) in the related art in which a CQI index that is calculated with a CQI table which corresponds to modulation schemes up to and including 64 QAM is notified, and an MCS index is notified with an MCS table that corresponds to modulation schemes up to and including 64 QAM, and a new mode (hereinafter, referred to as a 256 QAM mode) in which a CQI index that is calculated with a CQI table which corresponds to modulation schemes up to and including 256 QAM is notified, and an MCS index is notified with an MCS table that corresponds to modulation schemes up to and including 256 QAM are prepared. Furthermore, in NPL 4, it is proposed that which table is selected is determined by a notification of a higher layer that is referred to as Radio Resource Control (RRC). With switching between the modes with the RRC, the transfer with 256 QAM can be supported without changing the number of bits of the CQI and the number of bits of the MCS.

CITATION LIST

Non Patent Literature

NPL 1: 3GPP TS36.212 V11.3.0
NPL 2: 3GPP TS36.213 V11.3.0
NPL 3: CATT, "Analysis on specification impact of higher order modulation," R1-135079, San Francisco, USA, Nov. 11-15, 2013
NPL 4: Panasonic, "Specification Impact of Introducing 256QAM," R1-135395, San Francisco, USA, Nov. 11-15, 2013

SUMMARY OF INVENTION

Technical Problem

Moreover, as the MCS in 256 QAM mode, a method (method 1) in which as disclosed in NPL 3, 256 QAM is introduced by deleting a low MCS (more precisely, QPSK) from 64 QAM mode, a method (method 2) in which as disclosed in NPL 4, 256 QAM is introduced by downsampling from the MCS table for 64 QAM mode, more precisely, while leaving some of QPSK behind, and the like are studied. Nevertheless, in method 1 in which the low MCS is deleted and 256 QAM is introduced, when a channel state that is so good that 256 QAM can be transferred without any error is abruptly changed to a channel state that is so poor that without QPSK, an error occurs, there is a need to perform a change from 256 QAM mode to 64 QAM mode with the RRC and to perform the transmission with QPSK. However, because a transmission periodicity of the RRC is comparatively long, in a case where the abrupt change in the channel state occurs, the transfer with QPSK is difficult to perform. Because of this, the throughput is decreased. On the other hand, in the case of method 2 in which the downsampled MCS table is used, a degradation in throughput that is so large that the transfer is difficult to perform does not occur, but because tight control of the MCS as in the pre-sampling 64 QAM mode prior to the downsamping is difficult to perform, a decrease in throughput is brought about.

An object of the present invention, which is made in view of the problems described above, is to increase throughout without increasing the number of pieces of control information.

Solution to Problem

In order to deal with the problems described above, constitutions of a terminal and a base station according to the present invention are as follows.

(1) In order to deal with the problems described above, according to an aspect of the present invention, there is provided a terminal apparatus including: a control information extraction unit that receives control information for requesting a CSI notification; a CQI calculation unit that calculates CQI according to the control information and calculates a CQI index by any CQI table of a first CQI table and a second subframe from the CQI; and a UL transmission unit that performs uplink transmission of the CQI index to a base station apparatus, in which, in a case where the control information is received on a first downlink subframe set, the CQI calculation unit generates the CQI index using the first CQI table, and in which, in a case where the control information is received on a second downlink subframe set, the CQI calculation unit generates the CQI index using the second CQI table.

(2) In order to deal with the problems described above, according to another aspect of the present invention, there is provided a terminal apparatus including: a CQI calculation unit that calculates CQI which corresponds to each of a first downlink subframe set and a second downlink subframe set, and calculates a CQI index by any CQI table of a first CQI table and a second subframe from the CQI; and a UL transmission unit that performs uplink transmission of the CQI index to a base station apparatus, in which, in a case where the UL transmission unit transmits the CQI index on a prescribed subframe, the CQI calculation unit generates the CQI index using the first CQI table, and in which, in a case where the UL transmission unit transmits the CQI index on a subframe other than the prescribed subframe, the CQI calculation unit generates the CQI index using the second CQI table.

(3) In order to deal with the problems described above, in the terminal apparatus according to the aspect of the present invention, a modulation scheme for the first CQI table is constituted from QPSK, 16 QAM, and 64 QAM, and a modulation scheme for the second CQI table includes at least 256 QAM.

(4) In order to deal with the problems described above, in the terminal apparatus according to the aspect of the present invention, information indicating the downlink subframe set is notified by RRC signaling that is extracted in an RRC extraction unit.

(5) In order to deal with the problems described above, in the terminal apparatus according to the aspect of the present invention, an RRC configuration unit configures the information indicating the downlink subframe set for every component carrier.

(6) In order to deal with the problems described above, according to still another aspect of the present invention, there is provided a base station apparatus including: a determination unit that determines an MCS for data transfer using any MCS table of a first MCS table and a second MCS table, and calculates an MCS index of the MCS; a PDSCH generation unit that modulates data by the MCS and generates a transmit signal; and a DL transmission unit that transmits the transmit signal, in which, in a case where the transmit signal is included in a first subframe set, the determination unit uses the first MCS table, and in which, in a case where the transmit signal is included in a second subframe set, the determination unit uses the second MCS table.

(7) In order to deal with the problems described above, in the base station apparatus according to the aspect of the present invention, a modulation scheme for the first MCS table is constituted from QPSK, 16 QAM, and 64 QAM, and a modulation scheme for the second MCS table includes at least 256 QAM.

Advantageous Effects of Invention

According to this invention, the number of pieces of control information can be suppressed from being increased, and application of 256 QAM can be efficiently supported.

BRIEF DESCRIPTION OF DRAWINGS

FIG. 3 is a CQI table for a 64 QAM mode according to the first embodiment.

FIG. 4 is a CQI table for a 256 QAM mode according to the first embodiment.

FIG. 5 is an MCS table for 64 QAM mode according to the first embodiment.

FIG. 6 is an MCS table for 256 QAM mode according to the first embodiment.

FIG. 8 is a table for describing a value of a CSI request field and operation thereof according to the first embodiment.

FIG. 9 is a table illustrating a modulation mode with the value of the CSI request field and a cell set according to the first embodiment.

FIG. 10 is a table illustrating another example of the modulation mode with the value of the CSI request field and the cell set according to the first embodiment.

FIG. 13 is one example of an arrangement of a USS and a CSS according to a second embodiment and the sequence chart of the modulation mode change according to the first embodiment.

FIG. 14 is one example of a CQI table for a 256 QAM mode according to a third embodiment.

FIG. 17 is a table illustrating a specific example of the value of the CSI request field and the operation thereof according to the fifth embodiment.

FIG. 18 is a diagram illustrating a fifth downlink subframe set and a corresponding CSI report subframe.

DESCRIPTION OF EMBODIMENTS

Figure 1:
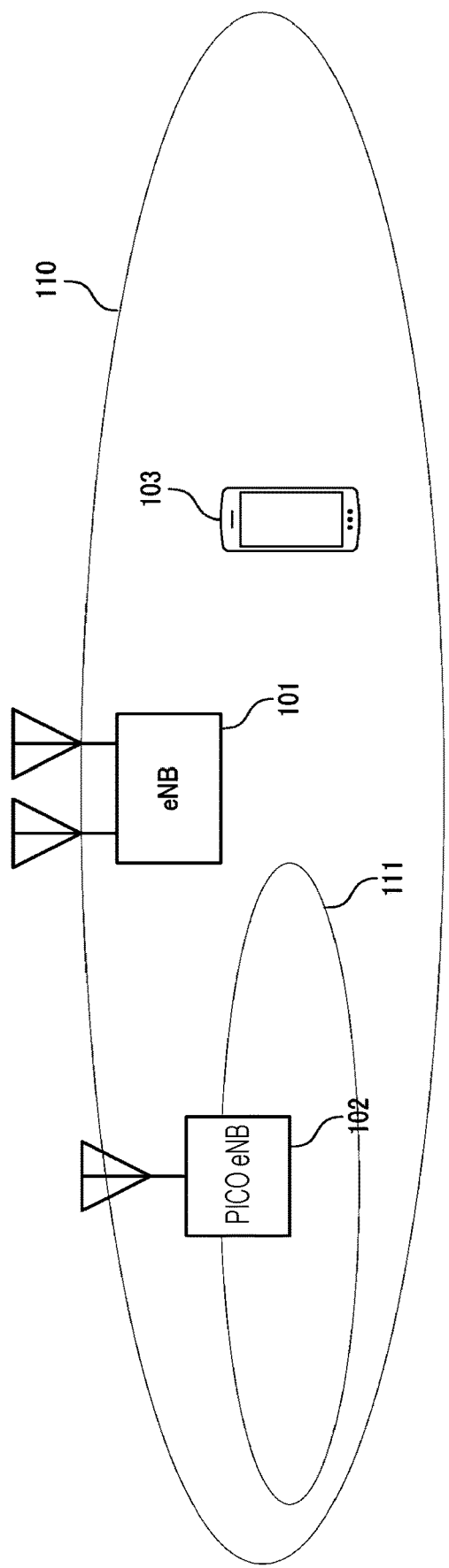
FIG. 1 is a diagram illustrating one example of a communication system according to a first embodiment.

A technology that is described in the present specification can be used in various wireless communication systems, such as a Code Division Multiple Access (CDMA) system, a Time Division Multiple Access (TDMA) system, a Frequency Division Multiplexing Access (FDMA) system, an orthogonal FDMA (OFDMA) system, a single carrier FDMA (SC-FDMA) system, and other systems. The terms "system" and "network" can often be used as having the same meaning. The CDMA system incorporates wireless technologies (standards), such as universal terrestrial radio access (UTRA) and CDMA2000 (a registered trademark). UTRA includes wideband CDMA (WCDMA (a registered trademark)) and types of improvements to the CDMA. The CDMA2000 covers IS-2000, IS-95, and IS-856 standards. The TDMA system can incorporate wireless technologies, such as Global System for Mobile Communications (GSM (a registered trademark)). The OFDMA system can incorporate wireless technologies, such as Evolved UTRA (E-UTRA), Ultra Mobile Broad band (UMB), IEEE 802.11 (Wi-Fi), IEEE 802.16 (WiMAX), IEEE 802.20, and Flash-OFDM (a registered trademark). 3GPP Long Term Evolution (LTE) is E-UTRA that employs SC-FDMA on uplink and OFDMA on downlink. LTE-A refers to a system, a wireless technology, or a standard that results from improvements to LTE. UTRA, E-UTRA, LTE, and LTE-A, and GSM (a registered trademark) are described with documents from the organizational Partners named Third Generation Partnership Project (3GPP). CDMA2000 and UMB are described with documents from the organizational Partners named Third Generation Partnership Project 2 (3GPP2). For clarity, according to an aspect of the present technology, data communication in LTE and LTE-A will be described below, and for the following description, the terms LTE and LTE-A will be frequently used.

Suitable embodiments of the present invention will be described in detail below referring to the accompanying drawings. The accompanying drawings and the following detailed description are provided for disclosure of exemplary embodiments of the present invention, and this does not indicate that these exemplary embodiments are all practical embodiments that can construct the present invention. The following detailed description includes a description of specific details of the present invention in order to provide a full understanding of the present invention. However, without these specific details, it is apparent to a person of ordinary skill in the art that the present invention can be put into practice. For example, the following detailed description is specifically provided on the assumption that a mobile communication system is a 3GPP LTE or LTE-A system, but except for details that are peculiar to 3GPP LTE and LTE-A, is applicable to other arbitrary mobile communications. Furthermore, the terms that will be used below are the terms that are defined considering functions according to the present invention, and can be changed according to user's or operator's intention or the custom. Therefore, the terms have to be defined based on the details throughout the specification.

A description of technical details that were well known in the art to which the present invention pertains to and that has no direct relationship with the present invention is omitted. This is because the omission of the unnecessary description helps to convey the nature and gist of the present invention more definitely without making the gist of the present invention indefinite. Consequently, in several cases, in order to avoid making the conception of the present invention ambiguous, a structure and an apparatus that are known can be omitted or be illustrated in the form of a block diagram in terms of core functions of each of the structure and the apparatus. In order to convey the gist of the present invention more definitely without making the gist of the present invention indefinite, some constituent elements in the drawings are proportionately enlarged, omitted, or schematically illustrated. Furthermore, the size of each constituent element does not reflect the actual size thereof. Furthermore, the same constituent elements are described using the same numeral reference numerals throughout the present specification.

Throughout the specification, when it is assumed that one portion "includes" one constituent element, unless otherwise particularly described, this means that another element can be further included without excluding the existing constituent element. Moreover, the term "or" that is used in any of the detailed description or claims is intended to mean an inclusive "or" rather than an exclusive "or". That is, unless otherwise designated, or unless clear from the context, the phrase "X uses A or B" is intended to mean that X uses any of natural inclusive permutations. That is, the phrase "X uses A or B" is satisfied by any one of the following examples: X uses A; X uses B, and X uses both A and B. In addition, unless otherwise designated, or unless clear from the context that the indefinite articles "a" and "an" are intended to indicate a singular form of a noun, generally, the indefinite articles "a" and "an" that are used in the present application and claims attached thereto have to be interpreted to mean "one or more". Furthermore, a constituent element name with the term "unit" or "module", an or- or er-suffixed constituent element name, or the like that is mentioned in the specification has the meaning of a unit for performing at least one function or one operation, and each of these can be realized as a software item, a hardware item, or a combination of both.

In addition, for description, it is hereinafter assumed that a terminal apparatus collectively refers to a mobile-type or fixed-type user terminal, such as a User Equipment (UE), a Mobile Station (MS) (Mobile Terminal (MT)), a mobile station apparatus, a mobile terminal, a subscriber unit, a subscriber station, a wireless terminal, a mobile device, a node, a device, a remote station, a remote terminal, a wireless communication device, a wireless communication device, a user agent, and an access terminal. Furthermore, it can be assumed that the terminal apparatus is a separate processing device for performing communication through a cellular telephone, a cordless telephone, a section initiation protocol (SIP) telephone, a smartphone, a wireless local loop (WLL) station, a personal digital assistant (PDA), a tablet computer, a lap-top computer, a handheld communication device, a handheld computing device, a satellite radio, a wireless modem card, a USB modem, a router, and/or a wireless system. Furthermore, it is assumed that a base station apparatus collectively refers to an arbitrary node on a network terminal that communicates with a terminal, such as a NodeB, an evolved NodeB (eNodeB), a base station, and an Access Point (AP). Moreover, it is assumed that the base station apparatus includes a Remote Radio Head (RRH) (which is also referred to as an apparatus that has an outdoor-type radio unit which is smaller in size than the base station apparatus, or a Remote Radio Unit (RRU)) (which is referred to as a remote antenna or a distributed antenna). The RRH can be said to be a special form of the base station apparatus. For example, the RRH can be said to be the base station apparatus that has only a signal processing unit and in which configuration of a parameter that is used in the RRH, determination of scheduling, and the like are performed by a different base station apparatus.

The terminal apparatus according to the present invention may be constituted to include a memory in which to retain commands associated with various types of processing that will be described below and a processor that is connected to the memory and that is constituted in such a manner as to execute the commands that are retained in the memory. The base station apparatus according to the present invention may be constituted to include a memory in which to retain commands associated with various types of processing that will be described below and a processor that is constituted in such a manner as to execute the commands that are retained in the memory.

Embodiments of the present invention will be described in detail below referring to the drawings. Channel State Information (CSI) that will be described below is constituted from a Rank Indicator (RI) that is a rank which the UE expects from an eNB for downlink transfer, a Precoding Matrix Indicator (PMI) indicating an index of a suitable precoding matrix in the rank, and a Channel Quality Indicator (CQI) indicating quality of each codeword.

[First Embodiment]

A first embodiment of the present invention will be described below referring to the drawings. FIG. 1 illustrates one example of a constitution of the wireless communication system according to the present embodiment. The system is constituted from a macro base station apparatus 101, a pico base station apparatus 102, and a terminal apparatus 103. An area 110 that is covered by the macro base station apparatus 101 and an area 111 that is covered by the pico base station apparatus 102 are present, and, according to a prescribed condition, the terminal apparatus makes a connection between the macro base station apparatus 101 and the pico base station apparatus 102. The number of antenna ports of the apparatus may be 1 or greater. The number of antenna ports here is not the number of physical antennas, and indicates the number of logical antennas that can be recognized by the apparatus that performs communication. Furthermore, the pico base station apparatus may not be the base station apparatus, and may be an apparatus that is referred to as a cluster head in a case where two terminal apparatuses perform direct communication with each other.

Figure 2:
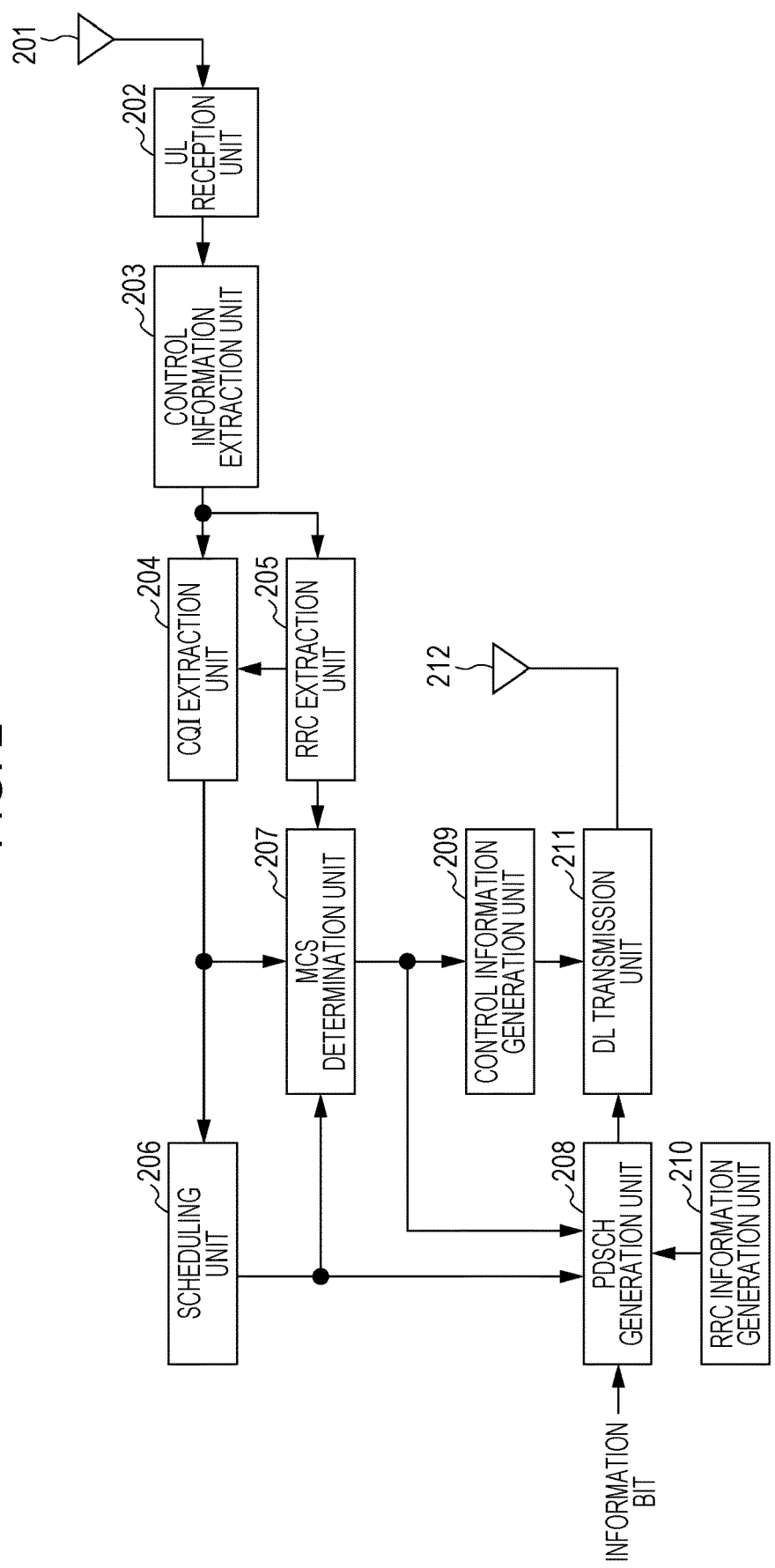
FIG. 2 is one example of a configuration of a base station apparatus according to the first embodiment.

FIG. 2 illustrates one example of a constitution of the macro base station apparatus 101. The constitution of the pico base station apparatus 102 may be the same as illustrated in FIG. 2. Moreover, FIG. 2 illustrates only a block that is indispensable to describe the present invention. A signal that is transmitted by the terminal apparatus 103 is received in a UL reception unit 202 through a receive antenna 201. Moreover, existing technologies, such as receive diversity and an adaptive array antenna, are also made to be applied to multiple receive antennas 201 that are present, and thus reception quality may be improved. The UL reception unit 202 performs processing, such as down-conversion or Fourier transform. An output of the UL reception unit 202 is input into a control information extraction unit 203. In the control information extraction unit 203, control information that is transmitted by the terminal apparatus is extracted. The control information here may be included in a Physical Uplink Control CHannel (PUCCH) that is a channel dedicated to the control information, and may be control information that is transmitted using a Physical Uplink Shared CHannel (PUSCH) that is a channel for transmission of information data. The control information that is extracted in the control information extraction unit 203 is input into a CQI extraction unit 204 and an RRC extraction unit 205. In the RRC extraction unit 205, information relating to RRC is extracted from the control information, and the extracted information is configured for each unit within the eNB. It is possible to perform various configurations. However, configurations that are directly associated with the present embodiment are a configuration (which is referred to as a modulation mode configuration according to the present embodiment) for determining which of a 64 QAM mode in which CQI and MCS tables in the related art are used and a 256 QAM mode in which a table that enables 256 QAM to be available, and a configuration (which is referred to as a CSI request configuration according to the present embodiment) for determining with which CC the eNB notifies the UE of the CSI when making a request for aperiodic CSI.

Moreover, according to the present embodiment, 64 QAM mode indicates a configuration in which the MCS table, the CQI table, and the like that are defined in Releases up to and including LTE Rel-11 are used, and indicates a configuration (constitution) in which 256 QAM is not included as a modulation scheme in which the MCS table that is applied to a PDSCH is constituted, a configuration (constitution) in which the modulation scheme in which the MCS table that is applied to a PDSCH is constituted is constituted from QPSK, 16 QAM, and 64 QAM, a configuration (constitution) in which 256 QAM is not included as the modulation scheme in which the CQI table that is used for feedback is constituted, a configuration (constitution) in which the modulation scheme in which the CQI table that is used for the feedback is constituted is constituted from QPSK, 16 QAM, and 64 QAM, or the like. On the other hand, according to the present embodiment, unlike in Releases up to and including LTE Rel-11, 256 QAM mode indicates a configuration in which the MCS table, the CQI table, and the like which assume that data transfer on the PDSCH in 256 QAM is performed are used, and indicates a configuration (constitution) in which at least 256 QAM is included as the modulation scheme in which the MCS table that is applied to the PDSCH is constituted, a configuration (constitution) in which the modulation scheme in which the MCS table that is applied to the PDSCH is constituted is constituted from QPSK, 16 QAM, 64 QAM, and 256 QAM, a configuration (constitution) in which 256 QAM is included as the modulation scheme in which the CQI table that is used for the feedback is constituted, a configuration (constitution) in which the modulation scheme in which the CQI table that is used for the feedback is constituted is constituted from QPSK, 16 QAM, 64 QAM, and 256 QAM, or the like. Switching between 64 QAM mode and 256 QAM mode is performed by a prescribed parameter that is given from a higher layer.

In the CQI extraction unit 204, a CQI index that is transmitted by each UE is extracted from the control information that is input from the control information extraction unit 203. The CQI here is information on downlink channel quality that is measured by the UE using the reference signal that is transmitted on the downlink. However, although the same CQI index is notified, interpretation in the eNB differs depending on which modulation mode of 64 QAM mode and 256 QAM mode the eNB configures. Which modulation mode is configured is determined by the RRC extraction unit 205 notifying the CQI extraction unit 204 that the UE has completed change configuration of the modulation mode. For example, in a case where with, the modulation mode configuration that is notified with the RRC, 64 QAM mode is configured in the eNB and the UE, with the CQI table as is illustrated in FIG. 3, the CQI index is interpreted as being notified by the UE. On the other hand, in a case where with, the modulation mode configuration that is notified with the RRC, 256 QAM mode is configured in the eNB and the UE, with the CQI table as is illustrated in FIG. 4, the CQI index is interpreted as being notified by the UE. At this point, the CQI table in FIG. 4 is one that results from decreasing the number of indexes for QPSK transfer in the table and replacing a CQI having high frequency efficiency, among CQIs for 64 QAM, with a CQI for 256 QAM in the table in FIG. 3. Moreover, FIG. 4 is one example. Any table that does not assume transfer in QPSK, or any CQI table that results from deleting the CQIs at equal intervals in the table in FIG. 3, is different from the CQI table in FIG. 3 as is the case with the modulation scheme, such as 256 QAM, and assumes transfer in 256 QAM may be available.

The CQI of each UE that is extracted in the CQI extraction unit 204 is input into a scheduling unit 206 and an MCS determination unit 207. In the scheduling unit 206, resource allocation to each UE is performed using the CQI of each UE. At this point, in a case where Multiple Input Multiple Output (MIMO) transfer is performed for the downlink, the scheduling is performed using the Rank Indicator (RI) or the Precoding Matrix Indicator (PMI) that is notified from the UE in addition to the CQI. Allocation information of each UE, which is output by the scheduling unit 206, is input into the MCS determination unit 207 and a PDSCH generation unit 208.

In the MCS determination unit 207, channel quality of a resource that is used for next-time transfer is estimated using resource allocation information that is input from the scheduling unit 206, the CQI index that is input from the CQI extraction unit 204, and the modulation mode that is input from the RRC extraction unit 205. Based on the estimated channel quality, an MCS of which a prescribed error rate is obtained is determined, and an MCS index is created. At this time, the created MCS index differs according to a modulation mode. For example, in a case where, with the modulation mode configuration that is notified with the RRC, 64 QAM mode is configured, the MCS index is selected from the MCS table as illustrated in FIG. 5. On the other hand, in a case where, with the modulation mode configuration that is notified with the RRC, 256 QAM mode is configured, the MCS index is selected from the MCS table as illustrated in FIG. 6. At this point, any MCS table in FIG. 6 that supports the modulation schemes up to and including 256 QAM may be available. The MCS index that is determined by the MCS determination unit 207 is input not only into the PDSCH generation unit 208, but also into a control information generation unit 209. In the control information generation unit 209, the MCS index that is input is mapped, as a format that is referred to as a DCI format, in the PDSCH, along with different control information such as allocation information. Moreover, in a case where the control information (the DCI format) is transmitted, PDCCH need not be used necessarily, a region for the control information may be secured in the PDSCH and transmission may be performed using the PDSCH.

In the PDSCH generation unit 208, with the MCS index of each UE, which is input from the MCS determination unit 207, coding and modulation are performed on an information bit that is destined for each UE, and a signal that is destined for each UE is mapped to the PDSCH according to the allocation information that is input from the scheduling unit 206. The mapped signal is input into a DL transmission unit 211. Furthermore, in a case where information that the RRC information generation unit 210 has to notify the UE of is present, the RRC information is input into the PDSCH generation unit 208 and is transmitted, as a data signal that is destined for the UE, on the PDSCH. The RRC information is information that is notified with RRC signaling, and includes the modulation mode configuration that is configuration information on each of the modulation modes (256 QAM mode and 64 QAM mode), a CSI request configuration that is a constitution of a cell set that corresponds to a value of a CSI request field, or the like.

In the DL transmission unit 211, signals that are input from the PDSCH generation unit 208 and a PDCCH generation unit 211 are multiplexed, and then IFFT processing, band-limiting filtering processing, up-conversion, and the like are performed on a result of multiplexing. A signal that is output by the DL transmission unit 211 is transmitted to the terminal apparatus 103 through a transmit antenna 212.

Figure 7:
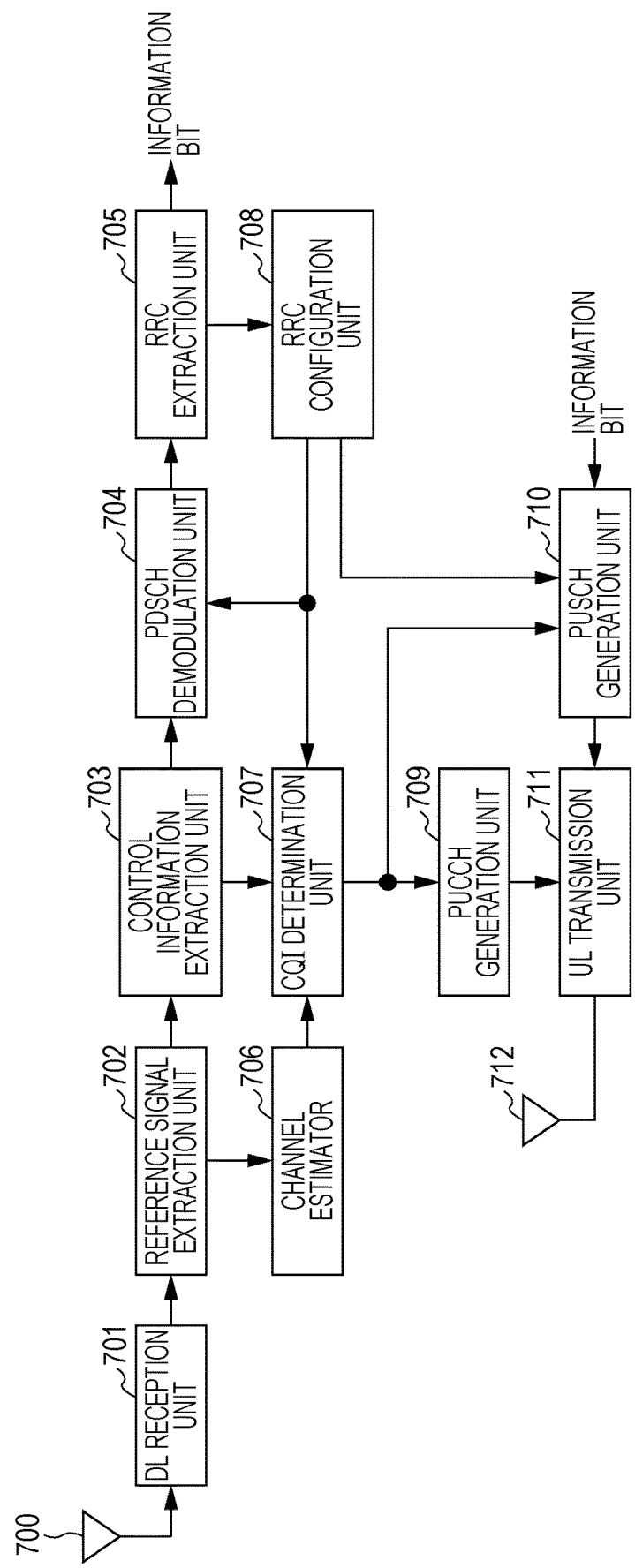
FIG. 7 is one example of a constitution of a terminal apparatus according to the first embodiment.

A signal that is transmitted by the macro base station apparatus 101 is received in the terminal apparatus 103 through a channel. FIG. 7 illustrates an example of a constitution of the terminal apparatus 103. A signal that is received in a receive antenna 700 is input into a DL reception unit 701, types of processing, such as the down-conversion, the band-limiting filtering, and discrete Fourier transform are performed on the signal that is input, and the obtained signal is input into a reference signal extraction unit 702. In the reference signal extraction unit 702, resources on which reference signals, such as a CRS, a CSI-RS, and a DMRS, that are transmitted by the eNB are transmitted are extracted, and the extracted resources are input into a channel estimator 706. In the channel estimator 706, a channel state between the eNB and the UE is estimated using the received reference signal that is input. A channel estimate that is obtained is input into a CQI determination unit 707. Moreover, although not illustrated in FIG. 7, some of the channel estimates that are obtained are also input in a PDSCH demodulation unit 704 for the purpose of being demodulated.

In the reference signal extraction unit 702, a resource element other than the reference signal is input into a control information extraction unit 703. In the control information extraction unit 703, information relating to the control information (the DCI format) is extracted from the received signal. Among the extracted pieces of control information, information relating to the MCS index of the PDSCH is input into the PDSCH demodulation unit 704. Furthermore, a feature according to the present invention is that control information relating to the aperiodic CSI, which is extracted, is input into the CQI determination unit 707, and that the control information relating to the aperiodic CSI is used in the CQI determination unit 707, and a description thereof will be provided below.

An output of the control information extraction unit 703 is input into the PDSCH demodulation unit 704. In the PDSCH demodulation unit 704, based on MCS information that is input from the control information extraction unit 703, demodulation of the PDSCH is performed. At this time, the MCS table that is referred to is selected based on the modulation mode configuration that is input from the RRC configuration unit 708, the MCS is determined from the selected MCS table and the notified MCS index, and the result is used for demodulation. For example, in the RRC configuration unit 708, in a case where 64 QAM mode is configured, determination of the MCS is performed based on the MCS table in FIG. 5, and in a case where 256 QAM mode is configured, the determination of the MCS is performed based on the MCS table in FIG. 6.

An output of the PDSCH demodulation unit 704 is input into an RRC extraction unit 708. In the RRC extraction unit 708, in a case where the RRC is included in the signal that is input, the RRC is extracted, and a result of the extraction is input into the RRC configuration unit 708. In the RRC configuration unit 708, processing that configures the control information that is transferred by the eNB with the RRC, for each unit of the UE, is performed. For example, in a case where the modulation mode configuration is notified with the RRC signaling and where 256 QAM mode is configured, in the PDSCH demodulation unit 704, the demodulation in 256 QAM mode is performed from the next-time or later transfer. Furthermore, the modulation mode configuration indicating whether the modulation mode is 64 QAM mode or 256 QAM mode is also input into a CQI configuration unit 707. As with the MCS configuration, in the case of 64 QAM mode, the CQI index is determined using the CQI table in FIG. 3, and in the case of 256 QAM mode, the CQI index is determined using the CQI table in FIG. 4.

Furthermore, in the RRC configuration unit 708, a result of configuring control with the RRC in each block within the UE is input into a PUSCH generation unit 710. The information that configuration of the RRC is completed is transmitted on the PUSCH to the eNB along with the information bit, and thus the eNB knows that the notified RRC information is configured in the UE.

In the CQI determination unit 707, the CQI is determined using the channel estimate that is input from the channel estimator 706 and the modulation mode configuration (the configuration indicating whether the modulation mode is 64 QAM mode or 256 QAM mode) that is input from the RRC configuration unit 708. Specifically, in the case of 64 QAM mode, the channel estimate is quantized with the CQI table in FIG. 4, and the CQI index that is a prescribed error rate is input into a PUCCH generation unit 710. Moreover, the notification of the CQI to the eNB may be performed on the PUCCH and may be performed on the PUSCH. In LTE, there are two types of notification of the CSI. One is notification of periodic CSI and the other is notification of the aperiodic CSI. While the notification of the periodic CSI is performed using the PUCCH, the notification of the aperiodic CSI is performed using the PUSCH. More precisely, as described above, the CQI index may be input into the PUSCH generation unit 710 without being input into a PUCCH generation unit 709.

Next, the feature of the present invention will be described in detail below. In a case where, as disclosed in the related art, the switching between the modulation modes is made to be performed with the modulation mode configuration that is notified with the RRC, the configuration with the RRC is transmitted from the eNB to the UE, the UE notifies the eNB that the configuration of the RRC which is notified is performed, and thus it is possible to change the modulation mode. However, it takes time to perform exchanging of the RRC. On the other hand, if control information relating to the modulation mode on the PDCCH or the like can be exchanged without using the RRC, because the modulation mode can be changed at high speed, although there is a case where the channel state abruptly changes, a suitable modulation mode can be selected. However, when an information bit indicating the selection of the modulation mode is attached to the PDCCH, the DCI format has to be newly defined, and furthermore, an amount of downlink control information is increased. Because of this, a decrease in effective throughput of data is caused.

Accordingly, according to the present embodiment, a method is described in which the modulation mode is changed at high speed without increasing the number of bits of the PDCCH.

In the LTE system, in a communication method that is referred to as a DCI format 0 or a DCI format 4 that is transmitted on the PDCCH, a two-bit field can be secured in order for the eNB to make a request to the UE for the Aperiodic CSI (A-CSI). This field is hereinafter referred to as the CSI request field. Information as illustrated in FIG. 8 can be transmitted with the two bits. As illustrated in FIG. 8, in a case where two bits are "10" and in a case where two bits are "11", an operation is performed that is given from the higher layer, but this is introduced in the specification in the current LTE system. At this point, it is possible to change configuration with the higher layer using the RRC signaling (CSI request configuration) that is described above. Therefore, configuration of the aperiodic CSI can be changed according to an environment, by changing the value of the CSI request field in the DCI format. However, because a field that is able to be designated with the CSI request field is only two patterns in the case of "10" and in the case of "11", the CSI request configurations that are the two patterns are made to be able to be changed to various configurations with the RRC signaling. In this manner, a specification is provided in which a high-speed change in a communication environment can be coped with, using a small amount of control information by combining a signal for which multiple configurations can be changed at high speed, and a signal for which a configuration itself of a certain thing can be changed at low speed.

According to the present embodiment, information on the modulation mode is added to the CSI request configuration that is configured with the RRC signaling. The reason for this is that the UE performs communication using multiple component carriers (CCs) (serving cells) for LTE, which are referred to as multiple cells, but that the multiple CCs which can be used by the UE are not limited to belonging to the same eNB and are constituted by multiple different eNBs. For example, it is assumed that the macro base station constitutes CC #1 and CC #2 and the pico eNB constitutes CC #3. In most cases, 256 QAM here is expected to be applied in the pico eNBs that are at a shorter distance from the UE than the macro eNBs because the pico eNBs are arranged to be more closely spaced than the macro eNBs. More precisely, normally, 256 QAM mode is applied in the pico eNB and 64 QAM mode is applied in the macro eNB. Therefore, in the case of "10" as illustrated in FIG. 9, with regard to CC #1, the CQI is calculated in 64 QAM mode and the notification of the CQI to the eNB on the PUSCH is performed. Furthermore, with regard to CC #3, the CQI is calculated in 256 QAM mode and the notification of the CQI to the eNB on the PUSCH is performed. However, in a case where, even in the CC that is constituted by the pico eNB, a blocking object suddenly appears between the UE and the eNB, because an SINR for reception in the UE is abruptly degraded, it is desirable that 64 QAM mode, not 256 QAM mode, is applied. However, it takes time to change the configuration with the RRC signaling. Accordingly, in the case of "11", it is assumed that the CQI is calculated in 64 QAM mode in CC #3. Although this configuration degrades the SINR abruptly and this brings about a situation where the communication is not performed in 256 QAM mode, a change to 64 QAM mode can be made at high speed by the DCI format that is notified on the PDCCH.

Moreover, in CC #3 that, as illustrated in FIG. 9, is constituted by the pico eNB, the modulation mode may be configured in such a manner that the mode is fixed in every CC as illustrated in FIG. 10, without the need to necessarily prepare 256 QAM mode and 64 QAM mode. In this case, the modulation mode of CC #3 needs to be changed to 64 QAM mode in transmitting the CQI in CC #2 in FIG. 9, but the CSI request configuration is changed with the RRC signaling. Thus, an operation in the CSI request field is configured as illustrated in FIG. 10. Because of this, the CQI table that is referred to when the UE calculates the CQI index that is notified to the eNB can be configured with a two-bit value of the CSI request field in the DCI format that is notified on the PDCCH (or an ePDCCH). As a result, the CQI can be transmitted in CC #2 while the modulation mode in CC #3 is maintained as 256 QAM, without configuring the CQI table that has to be referred to, by changing the modulation mode configuration with the RRC signaling.

The configuration of the modulation mode is described above as being able to be performed in every CC in a case where multiple CCs are present. Incidentally, in LTE Rel-11, it is possible for multiple eNBs to cooperate with one another to communicate with the UE, and a transfer mode is stipulated for performing coordinated communication. In order to perform the coordinated communication, it is preferable that the UE notifies multiple eNBs of the CSI, and a mechanism that is referred to as multiple CSI processes is introduced in the specification. In the multiple CSI processes, each UE can perform multiple CSI reports in each CC. Accordingly, with regard to the multiple CSI report processes (which is hereinafter referred to as a CSI process) within one CC, each of the modulation modes is individually configured, and thus the modulation mode can be changed at every transmission point (eNB) in the coordinated communication, such as dynamic switching between transmission stations. More precisely, different CQI tables can be configured, with the RRC signaling, for each CSI process, and the CQI index based on the CQI table that is configured (constituted) with the RRC signaling can be reported for every CSI process.

Figure 11:
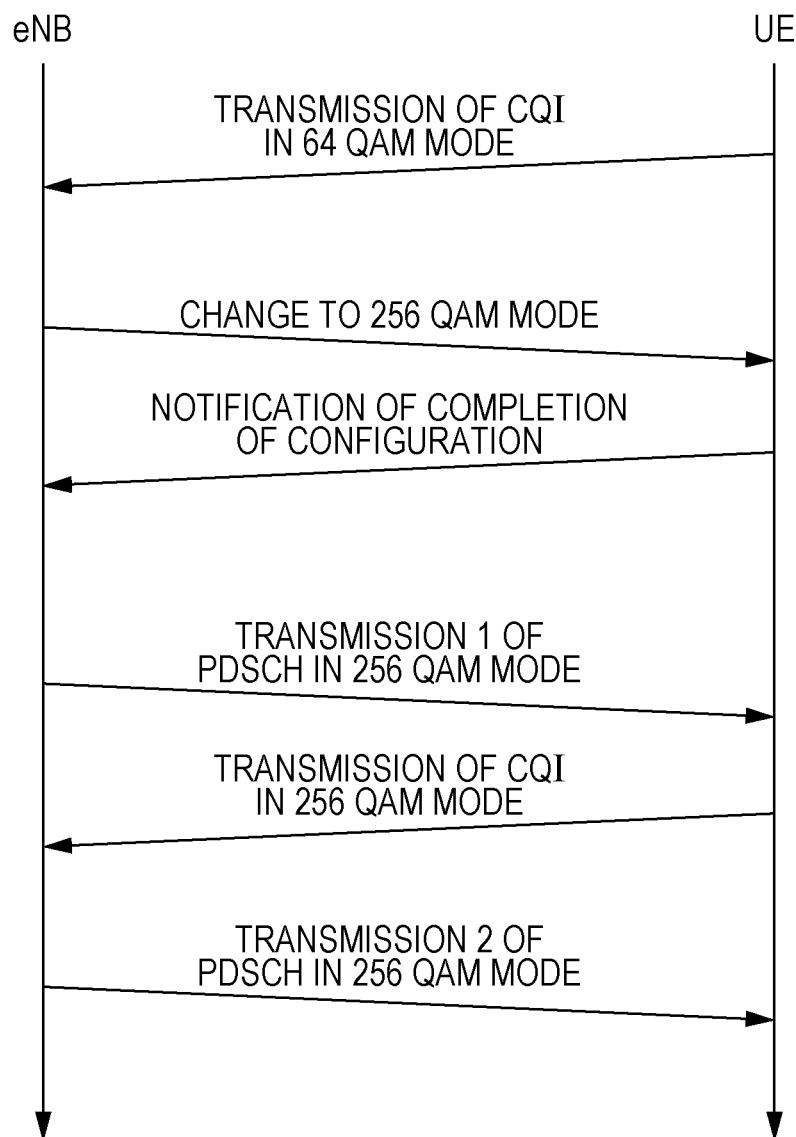
FIG. 11 is one example of a sequence chart of a modulation mode change in the related art.

Next, a different effect of the present embodiment is described. A case where the present invention is not used is first described referring to a sequence chart in FIG. 11. An example in which the modulation mode is changed with the RRC is described. First, the UE notifies the eNB of the CQI in 64 QAM mode. With the received CQI, the eNB determines that the SINR for reception in the UE is sufficiently high, and notifies the UE that configuration for 256 QAM mode is performed, with the RRC. The UE that receives the RRC notifies the eNB that the configuration of 256 QAM mode is completed. Thereafter, the eNB performs transfer in 256 QAM mode. At this point, because the UE notifies the eNB of the CQI only in 64 QAM, there is a low likelihood that the eNB will be able to select a suitable MCS. After the transfer of the PDSCH, when transmitting the CQI, the UE performs the notification of the CQI in 256 QAM mode, and in the next transmission on the PDSCH, 256 QAM mode operates in the suitable MCS. With a change of the modulation mode with the RRC in this manner, there is a high likelihood that the suitable MCS will not be selected in the initial transfer of the PDSCH after the change of the modulation mode. Next, the change of the modulation mode, in which the CSI request field within the PDCCH is used, and which is disclosed according the present embodiment, will be described below referring to a sequence chart in FIG. 12. The configuration of the modulation mode in every CC in the system is constituted in advance with an initial configuration or the RRC. As with the related art, the UE notifies the eNB of the CQI in 64 QAM mode in a certain CC. In a case where with the received CQI, the eNB determines that the configuration for 256 QAM may be better, the eNB makes a request to the UE for feedback on the CQI in 256 QAM mode in the CC, using the CSI request field within the PDCCH. At this time, on the PDCCH, the DCI format in which uplink data transfer, more precisely, resource allocation for the PUSCH is also notified is used. The UE that receives the PDCCH calculates the CQI in the CC, and then calculates the CQI index using the CQI table for 256 QAM mode and transmits the calculated CQI index on the PUSCH in a prescribed CC. The eNB that receives the PUSCH selects a suitable MCS using the CQI in the notified 256 QAM mode, and performs the transfer of the PDSCH in 256 QAM mode. In this manner, in some cases, with the change of the modulation mode with the RRC, there is no CQI after the mode is changed and the suitable MCS is difficult to select, but in a case where the CSI request field within the PDCCH is used, because a request can be made to the UE for the notification of the CSI request field in the DCI format, along with the notification of the modulation mode configuration with the RRC signaling, the PDSCH transfer with the suitable MCS is possible after the mode is changed. Moreover, as illustrated in FIG. 10, with the constitution (configuration) of the CSI request configuration, a request can be made for the feedback on the CQI in the modulation mode that varies with every CC can be requested.

Figure 12:
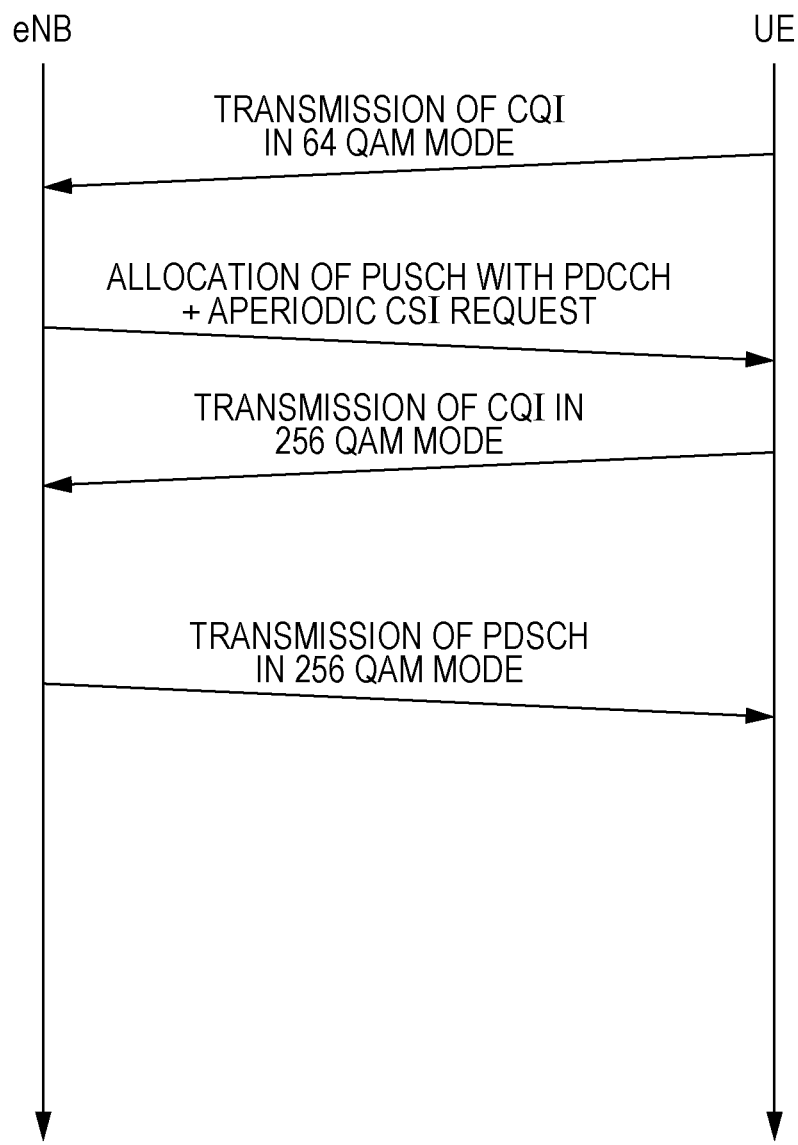
FIG. 12 is one example of a sequence chart of a modulation mode change according to the first embodiment.

According to the present embodiment, an example is described in which the configuration of the modulation mode is performed, with the CSI request configuration, for every CC, but the configuration of the modulation mode may be performed while being associated with the value of the CSI request field. For example, in the case of "10", 64 QAM mode may be assumed, and in the case of "11", 256 QAM mode may be assumed. Furthermore, FIG. 12 illustrates an example in which, in a case where a request for transmission of the CSI is detected in the CC for which 256 QAM mode is configured, the UE notifies the CQI in 256 QAM mode and then receives the PDSCH that is transmitted in 256 QAM mode, from the eNB. As another example, in a case where the UE receives the modulation mode for every CC with the RRC and then the eNB transmits the PDSCH before a request is made for the transmission of the A-CSI in 256 QAM mode, the transmission may be performed in 64 QAM mode. More precisely, with the transmission of the A-CSI in 256 QAM mode, the switching between the modulation modes may be performed.

Furthermore, as described above, with the modulation mode configuration that is notified with the RRC, the MCS determination unit 207 can determine the MCS table that is referred to, but moreover, with a method different from this, the MCS determination unit 207 can select the MCS table that is referred to. With the RRC scheduling, the eNB notifies the UE of the CSI request configuration, and is notified by the UE that the CSI request configuration is applied (constituted). For example, a case where the CSI request configuration is configured as illustrated in FIG. 9 is considered. At this point, when with the DCI format that is transmitted on the PDCCH, "10" is notified as the CSI request field, the selection of the MCS table with 64 QAM mode in CC #1 and 256 QAM mode in CC #3 can be performed with the DCI format without depending on the modulation mode configuration with the RRC. In this manner, the MCS determination unit 207 can generate the MCS index, with the RRC extraction unit 205 that extracts the information that the DCI format that is input from the control information generation unit 209, the CSI request configuration that is generated by an RRC generation unit 210, and the CSI request configuration are applied in the UE.

[Second Embodiment]

According to the first embodiment, the method is disclosed in which the modulation mode is changed at higher speed with the CSI request field that is included in the PDCCH than with the RRC. According to the present embodiment, a method is disclosed in which the modulation mode is changed at high speed using a method other than the method for the CSI request field.

In LTE, the PUCCH has a region that is referred to as a UE-specific Search Space (USS) and a region that is referred to as a Common Search Space (CSS), and the eNB can arrange the control information (the allocation information, the MCS, or the like) that is destined for the UE, in the USS and the CSS. The UE checks both of the USS and the CSS for the presence of absence of the control information that is destined for the UE itself.

Accordingly, whether the control information is information that is notified with the USS, or information that is notified with the CSS is checked. For example, associations of the USS and the CSS with the modulation modes, respectively, are as illustrated in FIG. 13. FIG. 13 is one example, a relationship between the USS and the CSS may be reversed. For example, in a case where the eNB wants to perform the transfer in 256 QAM mode, the eNB notifies the UE, for which the MCS index that is notified with the USS is configured as 256 QAM mode and the MCS index that is notified with the CSS is configured as 64 QAM mode, the eNB notifies, of the control information using the USS. Because the control information is included in the USS that is destined for the UE itself, the UE determines the MCS for the PDSCH, using the notified MCS index and the MCS table for 256 QAM mode. Furthermore, in a case where the channel state abruptly changes and the eNB determines that a higher throughput characteristic is obtained in 64 QAM mode than in 256 QAM mode, in order to perform a change to 64 QAM mode, the eNB performs the notification of the control information with the CSS.

At this point, when it is assumed that the USS needs to be used to notify 256 QAM at all times, because there is a concern that an unbalance between the size of the USS and the size of the CSS will occur, an association between the USS and the CSS may be configured (constituted) with the RRC signaling. Furthermore, in a case where the channel state is stationary, the change of the modulation mode is unnecessary, and in a case where the UE moves at high speed, a change of the modulation mode is indispensable. Accordingly, on the assumption that the change of the modulation mode is basically performed with the RRC, switching between reading pieces of control information with the USS and the CSS, which is described above, may be performed in a transient state that is maintained until the eNB notifies the configuration with the RRC and then the UE notifies the eNB that the configuration is completed. Moreover, in a case where multiple CCs are present, the change of the modulation mode may be performed only on the CC in which the PDCCH is transmitted, and the change of the modulation mode may be applied in all the CCs.

Moreover, in addition to the PDCCH in LTE Releases up to and including LTE Rel-10, a control channel that is referred to as an enhanced PDCCH (ePDCCH) is defined in LTE Rel-11. The control information can be notified on the ePDCCH, using one portion of a PDSCH region, not using a PDCCH region in the related art. Accordingly, as opposed to the modulation mode being changed depending on whether the DCI format is arranged in the USS or is arranged in the CSS, which is described above, the modulation mode may be changed based on whether the DCI format is arranged in the ePDCCH or is arranged in the PDCCH (the USS or the CSS) and the CQI index may be fed back to the eNB with the CQI table that corresponds to the changed modulation mode. Furthermore, the modulation mode may be changed depending on whether the DCI format is arranged in the CSS of the PDCCH or is arranged in the USS of the PDCCH or the ePDCCH, and at least one of the CQI table and the MCS table that are referred to may be selected.

In this manner, the UE changes the modulation mode depending on whether the control information is arranged in the USS of the PDCCH or is arranged in the CSS. By doing this, the modulation mode can be changed without depending on the RRC. As a result, because the modulation mode can be caused to accommodate the change of the channel state, the throughput can be increased.

Furthermore, processing that varies according to which of regions of the USS and the CSS of the PDCCH the DCI format is arranged in may be applied to the DCI format that is described according to the first embodiment. For example, in 64 QAM mode, in a case where the eNB makes a request to the UE for the CSI report, the control information generation unit 209 generates the PDCCH in such a manner that the DCI format which includes the CSI request field is arranged in the USS. The UE decodes the DCI format that is destined for the UE itself and that is arranged in the USS, with the control information extraction unit 703. At this point, as illustrated in FIG. 13, when an association between the arrangement of the DCI format and the modulation mode is made, in a case where the DCI format is arranged in the USS, the CQI determination unit 707 generates the CQI index that is notified to the eNB, using the CQI table (for example, FIG. 4) in 256 QAM mode. On the other hand, in a case where the eNB makes a request to the UE for the CQI for 64 QAM mode, the control information generation unit 209 arranges the DCI format that includes the CSI request field, in the CSS. In this manner, with the control information generation unit 209, the eNB can make a request to the UE for the CQI index in different modulation modes, depending on whether the DCI format is arranged in the USS, or is arranged in the CSS. Moreover, the switching between the modulation modes with the arrangement of the USS and the CSS is not limited to that described above. For example, in a case where the number of modulation modes is limited to 2, arrangement request can be made for the CQI index in different modulation modes by arranging the DCI format in the USS in a case where a request is made for the CQI index that is different from that in the modulation mode that is configured with the RRC signaling, and by arranging the DCI format in the CSS in a case where a request is made for the CQI index in the same modulation mode.

[Third Embodiment]

According to a separate embodiment, in a case where the eNB makes a CSI request to the UE, with regard to the CQI index that is fed back to the eNB by the UE, which of multiple CQI tables the CQI table based on which the CQI index has to be generated is described.

The CSI request is made with a format that includes the resource allocation for the PUSCH, which is referred to as the DCI format 0 and the DCI format 4. The DCI format 0 is a format for transmitting the PUSCH with a single antenna, and the DCI format 4 is a format for transmitting the PUSCH with a multi-antenna. The eNB notifies the UE of the DCI format 0 and 4 on the PDCCH.

At this point, multi-antenna transmission can improve the SINR much more than single antenna transmission. More precisely, there is a high likelihood that the transfer with 256 QAM will be performed without an error. Accordingly, in a case where the eNB generates the DCI format 4 with the control information generation unit 209 and where the DCI format 4 is detected in the control information extraction unit 703 of the UE, when a request for transmission of the aperiodic CSI is configured in the CSI request field, the CQI index is generated based on the CQI table for 256 QAM mode in the CQI determination unit 707. The generated CQI index is input into the PUSCH generation unit 710, and is transmitted to the eNB through a UL transmission unit 711 and a transmit antenna 712. On the other hand, the single antenna transfer has a lower SINR than the multi-antenna transfer. More precisely, there is a high likelihood that an error will occur in 256 QAM. In a case where the eNB generates the DCI format 0 with the control information generation unit and where the DCI format 0 is detected in the control information extraction unit 703 of the UE, when the request for the transmission of the aperiodic CSI is configured in the CSI request field, the CQI index, as with the LTE system in the related art, is generated based on the CQI table for 64 QAM mode in the CQI determination unit 707. The generated CQI index is input into the PUSCH generation unit 710, and is transmitted to the eNB through the UL transmission unit 711 and the transmit antenna 712.

In this manner, the CQI that results from changing the CQI table that is referred to at a higher speed than is the case with notification by the RRC can be fed back by configuring the CQI table that is referred to, based on a type of DCI format that the eNB notifies the UE of.

Moreover, it is possible to configure a two-bit CSI request field in the DCI format 4 and the DCI format 0. Accordingly, as with the first embodiment, the modulation mode for each CC and each CSI report may be changed by using a value that is able to be configured with the RRC, in the two-bit CSI request fields in the DCI format 0 and the DCI format 4.

Furthermore, the CQI table that is referred to is described as being changed with the region (which is the USS or the CSS) in which the DCI format is arranged, but the present embodiment is not limited to this. For example, a method in which the CQI table that is referred to is configured with a number of a subframe on which the DCI format is received, or a number of a subframe on which the CQI index is notified is also included in the present invention. Furthermore, no limitation to the number of the subframe is imposed, and the CQI table or the MCS table that is referred to may be configured with an uplink and downlink configuration in dynamic TDD.

[Fourth Embodiment]

In a case where the change of the modulation mode is performed with the RRC, it is possible not to perform communication on the PDSCH and the like until the UE notifies that the configuration with RRC is completed. However, because the RRC is transmitted on the PUSCH, the PDSCH is difficult to transmit as long as resource allocation for the uplink is not performed. Before the notification that the configuration is completed is received from the UE, it is possible to transmit the PDSCH in the pre-change modulation mode (or the post-change modulation mode). However, in a case where the UE changes the modulation mode (or in a case where the UE does not change the modulation mode), discordance occurs in the MCS table that has to be referred to during the transmission and reception, and data is difficult to correctly demodulate/decode. Accordingly, according to the present embodiment, a method is disclosed in which before the notification that the configuration with the RRC is completed is received from the UE, the transfer in the MCS is made possible after the change of the modulation mode.

The CQI table that is currently used in LTE is the one that is illustrated in FIG. 3, and the MCS table is the one that is illustrated in FIG. 5. A case where as with the first embodiment, a table that is illustrated, as the CQI table for 256 QAM mode, in FIG. 4 is used is considered. At this time, in the tables in FIGS. 3 and 4, the CQI indexes 0 and 1 indicate the same frequency efficiency. More precisely, in a case where the index is 0 or 1, although different modulation modes are selected between the eNB and the UE, the same channel quality is indicated. According to the present embodiment, the index in which the channel quality that is indicated by the index is the same in each modulation mode in this manner is intentionally is created.

FIG. 14 indicates the CQI index in 256 QAM mode according to the present embodiment. Indexes that are not surrounded by thick lines are indexes each of which is added in 256 QAM mode, and are indexes each of which demands the transfer in 256 QAM. The indexes that are surrounded by thick lines are indexes each of which demands the transfer in the same MCS as that in 64 QAM mode (FIG. 3). For example, a case where the eNB notifies the UE that the change to 256 QAM mode is made and the configuration is performed in the UE, but where in order not to allocate the PUSCH, the eNB is not notified that the configuration of the RRC is completed is considered. At this time, with the periodic CSI or the like, the UE needs to notify the eNB of the CQI and 256 QAM mode is configured for the UE, but the eNB determines that the UE still remains in 64 QAM mode. In this case, it is determined that the notified CQI index is for different channel quality.

At this point, when it comes to the notification of the CQI before performing this notification that the configuration of the RRC is completed, the notification of the CQI is performed using CQI indexes (more precisely, 0, 1, 3, 5, 7 to 12) that are not surrounded by thick lines in the CSI table in FIG. 14. For example, in 256 QAM mode, even in a case where a request can be made for the transfer at a frequency efficiency of approximately 7, a request is made for a frequency efficiency of 3.9023 for the CQI index 12. By doing this, in the eNB, although the CQI table for 64 QAM mode is referred to, because a suitable MCS can be selected, the CQI table that is referred to can be caused to differ, thereby limiting a transfer rate.

The index and information in the CQI table are caused to be common to multiple tables as described above, and additionally are common to the MCS table in the same manner. Thus, the MCS table that is referred to can be caused to differ, thereby eliminating the transfer error. Moreover, in FIG. 6, 256 QAM modes are arranged in order of increasing a coding rate of 256 QAM, but no limitation to this is imposed. An arrangement in order of decreasing the coding rate of 256 QAM, an arrangement for minimizing a square error, or any other arrangement may be available. Furthermore, for indexes indicating different pieces of information with multiple tables, three 256 QAMs at equal intervals and three continuous QAMs are assumed in FIG. 14, but no limitation to this is imposed.

[Fifth Embodiment]

A fifth embodiment of the present invention will be described below referring to a constitution of the wireless communication system in FIG. 1. The system is constituted from the base station apparatus (macro base station apparatus) (eNB) 101, the base station apparatus (pico base station apparatus) (pico eNB) 102, and the terminal apparatus 103. The area 110 that is covered by the base station apparatus 101 and the area 111 that is covered by the base station apparatus 102 are present. The terminal apparatus 103 makes a connection to the base station apparatus 101 and the base station apparatus 102 according to a prescribed condition. The number of antennas that constitutes each of the apparatuses may be 1 or greater. The antenna port here is not a physical antenna, and indicates a logical antenna that can be recognized by the apparatus that performs communication.

One example of a constitution of the base station apparatus (the base station apparatus 101 or the base station apparatus 102) is described referring to FIG. 2. Moreover, constitutions of the base station apparatus 101 and the base station apparatus 102 may be different from each other. Moreover, FIG. 2 illustrates only blocks (processing units) indispensable for the description of the present invention. The signal that is transmitted by the terminal apparatus 103 is received in the UL reception unit 202 through the receive antenna 201. Moreover, the receive antenna 201 is constituted from multiple antennas, and a technology such as the receive diversity or the adaptive array antenna may be applied to the receive antenna 201. The UL reception unit 202 performs the processing, such as the down-conversion or the Fourier transform. The output of the UL reception unit 202 is input into the control information extraction unit 203.

In the control information extraction unit 203, the control information that is transmitted by the terminal apparatus 103 is extracted. The control information here is control information that is transmitted using the physical uplink control channel (PUCCH) which is a channel for the control information, or control information that is transmitted using the Physical Uplink Shared CHannel (PUSCH) which is a channel for the transmission of the information data transmission. The control information that is extracted in the control information extraction unit 203 is input into the CQI extraction unit 204 or the RRC extraction unit 205. In the RRC extraction unit 205, the information relating to the RRC is extracted from the control information.

The base station apparatus performs the configuration of 64 QAM mode or 256 QAM mode on the terminal apparatus 103. 64 QAM mode means a configuration in which the MCS table, the CQI table, and the like which does not assume that the data transfer on the PDSCH in 256 QAM is performed are used, and means a configuration (constitution) in which 256 QAM is not included as the modulation scheme in which the MCS table that is applied to the PDSCH is constituted, a configuration (constitution) in which the modulation scheme in which the MCS table that is applied to the PDSCH is constituted is constituted from QPSK, 16 QAM, and 64 QAM, a configuration (constitution) in which 256 QAM is not included as the modulation scheme in which the CQI table that is used for the feedback is constituted, a configuration (constitution) in which the modulation scheme in which the CQI table that is used for the feedback is constituted is constituted from QPSK, 16 QAM, and 64 QAM, or the like. On the other hand, 256 QAM mode means a configuration in which the MCS table, the CQI table, and the like which assumes that the data transfer on the PDSCH in 256 QAM is performed are used, and means a configuration (constitution) in which at least 256 QAM is included as the modulation scheme in which the MCS table that is applied to the PDSCH is constituted, a configuration (constitution) in which the modulation scheme in which the MCS table that is applied to the PDSCH is constituted is constituted from QPSK, 16 QAM, 64 QAM, and 256 QAM, a configuration (constitution) in which 256 QAM is included as the modulation scheme in which the CQI table that is used for the feedback is constituted, a configuration (constitution) in which the modulation scheme in which the CQI table that is used for the feedback is constituted is constituted from QPSK, 16 QAM, 64 QAM, and 256 QAM, or the like.

In the CQI extraction unit 204, the CQI index that is transmitted by each terminal apparatus 103 is extracted from the control information that is input from the control information extraction unit 203. At this point, the CQI is information indicating the downlink channel quality that is measured by the terminal apparatus 103 using the reference signal that is transmitted on the downlink. However, in a case where the terminal apparatus 103 transmits the CQI in 64 QAM mode and in a case where the terminal apparatus 103 transmits the CQI in 256 QAM mode, pieces of information (a combination of the modulation scheme and the coding rate) that correspond to the CQI indexes, respectively, are different from each other. In a case where it is determined that the terminal apparatus 103 transmits the CQI in 64 QAM mode, with the CQI table as illustrated in FIG. 3, the CQI extraction unit 204 interprets this as the information that the terminal apparatus 103 notifies the CQI index. In a case where it is determined that the terminal apparatus 103 transmits the CQI in 256 QAM mode, with the CQI table as illustrated in FIG. 4, the CQI extraction unit 204 interprets this as the information that the terminal apparatus 103 notifies the CQI index. At this point, the CQI table in FIG. 4 is one that results from decreasing the number of indexes for QPSK transfer and replacing the CQI having the high frequency efficiency, among the CQIs for 64 QAM, with the CQI for 256 QAM transfer in the table in FIG. 3. Moreover, FIG. 4 is one example of the CQI table for 256 QAM mode. Any table that includes 256 QAM without including some or all of QPSK, 16 QAM, and 64 QAM, or any CQI table that results from at equal intervals deleting the CQIs in the table in FIG. 3, is different from the CQI table in FIG. 3 as is the case with the modulation scheme, such as 256 QAM, and assumes the transfer in 256 QAM may be available.

The CQI of each terminal apparatus 103, which is extracted in the CQI extraction unit 204, is inputted into the scheduling unit 206 and the MCS determination unit 207. In the scheduling unit 206, the resource allocation to each terminal apparatus 103 is performed using the CQI of each terminal apparatus 103. At this point, in the case where the Multiple Input Multiple Output (MIMO) transfer is performed for the downlink, the scheduling is performed using the Rank Indicator (RI) or the Precoding Matrix Indicator (PMI) that is notified from the terminal apparatus 103 in addition to the CQI. The allocation information of each terminal apparatus 103, which is output by the scheduling unit 206, is input into the MCS determination unit 207 and a PDSCH generation unit 208.

In the MCS determination unit 207, the channel quality of the resource that is used for the next-time transfer is estimated using the resource allocation information that is input from the scheduling unit 206 and the CQI that is input from the CQI extraction unit 204. Base on the estimated channel quality, the MCS of which a prescribed error rate is obtained is determined, and the MCS index is created. At this time, the MCS index that is created differs according to the modulation mode. For example, in a case where 64 QAM mode is configured, the MCS determination unit 207 selects the MCS index from the MCS table as illustrated in FIG. 5. For example, in a case where 256 QAM mode is configured, the MCS determination unit 207 selects the MCS index from the MCS table as illustrated in FIG. 6. Moreover, according to the present embodiment, if modulation schemes up to and including 256 QAM are supported, the MCS table that is different from the MCS table that is illustrated in FIG. 6 may be used. The MCS index that is determined by the MCS determination unit 207 is input not only into the PDSCH generation unit 208, but is also input into the control information generation unit 209. The control information generation unit 209 generates a signal on the assumption that the MCS index that is input, along with different control information such as the allocation information, is a format that is referred to as the DCI format. A signal that is generated from the DCI format is mapped to the PDCCH. Furthermore, the control information generation unit 209 generates the DCI format (the DCI format 0 or the DCI format 4) including information (the CSI request) that triggers transmission of the Aperiodic CSI (which is also referred to as the A-CSI).

With the MCS index that is input from the MCS determination unit 207, the PDSCH generation unit 208 performs coding and modulation on the information bit that is destined for each terminal apparatus 103. According to the allocation information that is input from the scheduling unit 206, the PDSCH generation unit 208 maps a signal that is destined for each terminal apparatus 103, to the PDSCH. The signal that is mapped is input into the DL transmission unit 211. Furthermore, in a case where the RRC information that the RRC information generation unit 210 has to notify the terminal apparatus 103 of is present, the RRC information is input into the PDSCH generation unit 208, and is mapped, as the data signal that is destined for the terminal apparatus 103, to the PDSCH for transmission. The RRC information is the information that is notified with the RRC signaling, and includes the modulation mode configuration that is the configuration information on each of the modulation modes (256 QAM mode and/or 64 QAM mode), the CSI request configuration that is the constitution (1 or multiple sets of cells) that corresponds to the value of the CSI request field, or the like.

The DL transmission unit 211 multiplexes the signals that are input from the PDSCH generation unit 208 and the control information generation unit 209, and then performs types of processing, such as inverse discrete Fourier transform, the band-limiting filtering, and the up-conversion, on a result of the multiplexing. A signal that is output by the DL transmission unit 211 is transmitted to the terminal apparatus 103 through the transmit antenna 212.

A signal that is transmitted by the base station apparatus (the base station apparatus 101 or the base station apparatus 102) is received in the terminal apparatus 103 through a channel. FIG. 7 illustrates an example of the constitution of the terminal apparatus 103. A signal that is received in the receive antenna 700 is input into the DL reception unit 701, and types of processing, such as the down-conversion, the band-limiting filtering, and the discrete Fourier transform, are applied to the signal that is input into the DL reception unit 701. A signal that is output from the DL reception unit 701 is input into the reference signal extraction unit 702. In the reference signal extraction unit 702, resources to which reference signals, such as a Cell-specific Reference Signal (CRS), a Channel State Information Reference Signal (CSI-RS), and a Demodulation Reference Signal (DMRS) (UE-specific Reference Signal), are mapped are extracted, and the extracted reference signals are input into the channel estimator 706. In the channel estimator 706, the channel state between the base station apparatus and the terminal apparatus 103 is estimated using the received reference signals that are input. An estimation value of the channel state, which is estimated, is input into the CQI determination unit 707. Moreover, although not illustrated in FIG. 7, the estimation value of the estimated channel state is also input into the control information extraction unit 703 and the PDSCH demodulation unit 704, and is used for demodulation of the signal that is mapped to the PDCCH or the PDSCH.

Signals other than the reference signals that are extracted in the reference signal extraction unit 702 are input into the control information extraction unit 703. For example, the signal that is mapped to the PDCCH is input into the control information extraction unit 703. In the control information extraction unit 703, information relating to the control information (downlink control information) (the DCI format) is extract from the received signal. Among the extracted pieces of control information, the information relating to the MCS index of the PDSCH is input into the PDSCH demodulation unit 704. Furthermore, in the control information extraction unit 703, among the extracted pieces of control information, the control information (a CSI request field) relating to the aperiodic CSI is input into the CQI determination unit 707.

The output of the control information extraction unit 703 is input into the PDSCH demodulation unit 704. For example, the signal that is mapped to the PDSCH is input into the PDSCH demodulation unit 704. In the PDSCH demodulation unit 704, the demodulation of the PDSCH is performed based on the MCS information (an MCS index or information relating to the MCS index) that is input from the control information extraction unit 703. At this time, the PDSCH demodulation unit 704 selects the MCS table that is referred to, based on the modulation mode configuration (64 QAM mode or 256 QAM mode) that is input from the RRC configuration unit 708, determines the MCS from the selected MCS table and the notified MCS index, and uses the determined MCS for demodulation. For example, the PDSCH demodulation unit 704 performs the determination of the MCS from the MCS index based on the MCS table in FIG. 5, in a case where 64 QAM mode is configured, and performs the determination of the MCS from the MCS index based on the MCS table in FIG. 6, in a case where 256 QAM mode is configured. Furthermore, the PDSCH demodulation unit 704 performs the determination of the MCS from the MCS index based on the MCS table in FIG. 5, on a subframe (downlink subframe) (subframe set) for which 64 QAM mode is configured, and performs the determination of the MCS from the MCS index based on the MCS table in FIG. 6, on a subframe (downlink subframe) (subframe set) for which 256 QAM mode is configured. The modulation mode configuration that is configured for each subframe is indicated by the RRC configuration unit 708.

The output of the PDSCH demodulation unit 704 is input into the RRC extraction unit 708. In the RRC extraction unit 708, in a case where the RRC signaling is included in the signal that is input, the RRC signaling is extracted and the extracted RRC signaling is input into the RRC configuration unit 708. With the RRC signaling, the RRC configuration unit 708 controls (performs processing that configures a control parameter) each processing unit of the terminal apparatus 103 using the control information that is transferred, by the base station apparatus. For example, the RRC configuration unit 708 determines a subframe (a subframe set) to which 64 QAM mode is applied and a subframe (a subframe set) to which 256 QAM mode is applied, based on the modulation mode configuration that is notified with the RRC signaling. For example, the RRC configuration unit 708 performs the configuration of the modulation mode on the PDSCH demodulation unit 704 at a subframe level (on a subframe basis). For example, the RRC configuration unit 708 performs the configuration of the modulation mode on the CQI determination unit 707 at the subframe level (on the subframe basis). On a subframe(subframe set) for which 64 QAM mode is configured, in a case where information indicating triggering of the aperiodic CSI (A-CSI) is input by the control information extraction unit 703, the CQI determination unit 707 performs the determination of the CQI index using the CQI table in FIG. 3. On a subframe (subframe set) for which 256 QAM mode is configured, in the case where information indicating the triggering of the aperiodic CSI (A-CSI) is input by the control information extraction unit 703, the CQI determination unit 707 performs the determination of the CQI index using the CQI table in FIG. 4.

The CQI determination unit 707 determines the CQI (a CQI index) using the channel estimate that is input from the channel estimator 706 and the modulation mode configuration (the configuration indicating whether the modulation mode is 64 QAM mode or 256 QAM mode) that is input from the RRC configuration unit 708. The CQI determination unit 707 selects the CQI table that is used for determination of the CQI index, based on the modulation mode configuration that is input. The CQI determination unit 707 selects which CQI table the CQI index belongs to, based on the channel estimate that is input. For the subframe (the downlink subframe) (the subframe set) (a downlink subframe set) for which 64 QAM mode is configured, the CQI determination unit 707 quantifies the channel estimate with the CQI table in FIG. 3, selects the CQI index that is a prescribed error rate, and inputs the selected CQI index into the PUCCH generation unit 709 or the PUSCH generation unit 710. For the subframe (the downlink subframe) (the subframe set) (a downlink subframe set) for which 256 QAM mode is configured, the CQI determination unit 707 quantifies the channel estimate with the CQI table in FIG. 4, selects the CQI index that is a prescribed error rate, and inputs the selected CQI index into the PUCCH generation unit 709 or the PUSCH generation unit 710. When it comes to the notification of the CSI, there is a method of notifying the CSI periodically and a method of notifying the CSI aperiodically. The PUCCH or the PUSCH is used for the transmission of the Periodic CSI (P-CSI). The PUSCH is used for the transmission of the aperiodic CSI.

Adaptive notification of the CQI that is based on each modulation mode can be realized without increasing the number (the number of bits for the DCI format) of bits that is transmitted and received on the PDCCH, by using the processing, the operation, or the like that is described according to the present embodiment. Because the number of bits for the DCI format is not increased, a decrease in throughput of the system is not caused.

Figure 15:
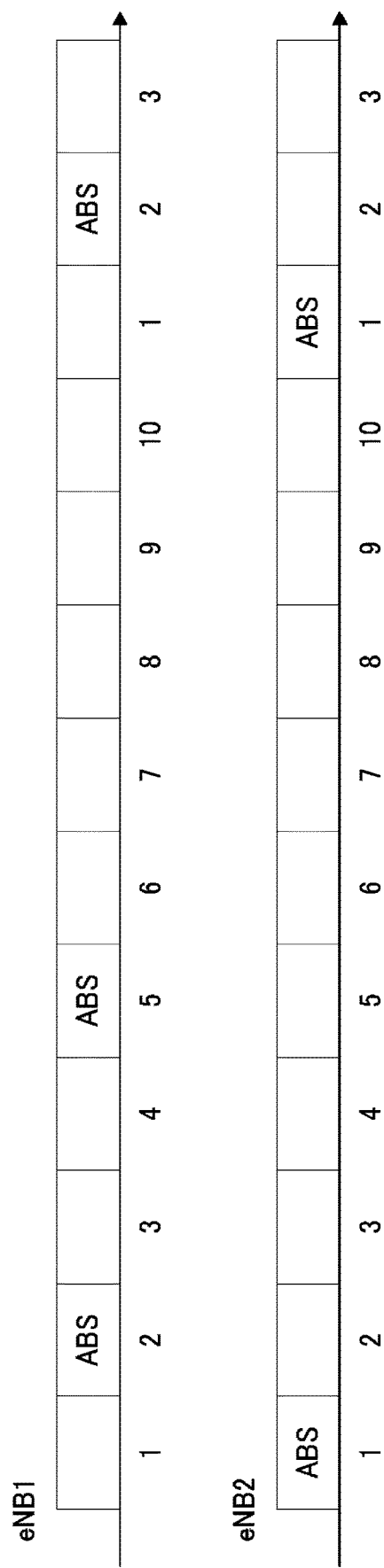
FIG. 15 is a diagram illustrating operations by multiple base station apparatuses, which use ABSs, according to a fifth embodiment.

According to the embodiment of the present invention, an Almost Blank Subframe (ABS) is used. FIG. 15 illustrates an application example of the ABS according to the embodiment of the present invention. An eNB 1 configures second and fifth subframes in a radio frame (one radio frame is constituted from 10 subframes) for the ABS, and does not perform data transmission on those subframes. In this case (or in a case where on the second and fifth subframes, the eNB 1 performs the data transmission at lower power than with other subframes), in the terminal apparatus 103 within a cell that is covered by a base station apparatus (for example, an eNB 2) in the neighborhood of the eNB 1, on the second and fifth subframes, an interference signal power is lower than with other subframes, and an SINR of a signal that is received from a base station apparatus (for example, the eNB 2) is higher than with other subframes. The eNB 2 configures a first subframe of a radio frame for the ABS, and does not perform the data transmission on the first subframe (or the eNB 2 performs the data transmission on the first subframe at a lower power than with other subframes). In this case, in the terminal apparatus 103 within the cell that is covered by the base station apparatus (for example, the eNB 1) in the neighborhood of the eNB 2, on the first subframe, the interference signal power is lower than with other subframes and the SINR of the signal that is received from the base station apparatus (for example, the eNB 1) is higher than with other subframes.

For subsequent description, the subframe, the SINR of which is higher than those of other subframes is hereinafter referred to as a coordinated subframe. A subframe that is the coordinated subframe is referred to as a first subframe, and a subframe that is not the coordinated subframe as a second subframe. A set of subframes that are the coordinated subframes is referred to as a first subframe set, and a set of subframes that are not the coordinated subframes as a second subframe set.

256 QAM mode is applied to the coordinated subframe, and 64 QAM mode is applied to the subframe that is not the coordinated subframe. For example, the RRC information generation unit 210 generates the RRC signaling indicating the subframe (the subframe set) that is the coordinated subframe and the subframes (the subframe set) that is not the coordinated subframe. For example, the MCS determination unit 207 uses the MCS table that is illustrated in FIG. 6, for the subframe (the subframe set) that is the coordinated subframe, and uses the MCS table that is illustrated in FIG. 5, for the subframe (the subframe set) that is not the coordinated subframe. For example, in a case where the terminal apparatus 103 is implicitly instructed to use the CQI table for 256 QAM mode, the control information generation unit 209 generates the DCI format that includes information which triggers the transmission of the aperiodic CSI, on the subframe (the subframe set) that is the coordinated subframe. Furthermore, in a case where the terminal apparatus 103 is implicitly instructed to use the CQI table for 64 QAM mode, the control information generation unit 209 generates the DCI format that includes information which triggers the transmission of the aperiodic CSI, on the subframe (the subframe set) that is not the coordinated subframe. Furthermore, in the case where the terminal apparatus 103 is implicitly instructed to use the CQI table for 256 QAM mode, the DCI format may be generated that includes the information which triggers the transmission of the aperiodic CSI on a subframe which results from adding an offset that is configured in advance to the subframe (the subframe set) that is the coordinated subframe. For example, the CQI extraction unit 204 uses the CQI table that is illustrated in FIG. 4, for the subframe (the subframe set) that is the coordinated subframe, and uses the CQI table that is illustrated in FIG. 3, for the subframe (the subframe set) that is not the coordinated subframe. For example, the RRC configuration unit 708 configures 256 QAM mode as the modulation mode configuration for the CQI determination unit 707 and the PDSCH demodulation unit 704 on the subframe (the subframe set) that is the coordinated subframe, and configures 64 QAM mode as the modulation mode configuration for the CQI determination unit 707 and the PDSCH demodulation unit 704 on the subframe (the subframe set) that is not the coordinated subframe. For example, the PDSCH demodulation unit 704 uses the MCS table that is illustrated in FIG. 6, for the subframe (the subframe set) that is the coordinated subframe, and uses the MCS table that is illustrated in FIG. 5, for the subframe (the subframe set) that is not the coordinated subframe. For example, the CQI determination unit 707 uses the CQI table that is illustrated in FIG. 4, for the subframe (the subframe set) that is the coordinated subframe, and uses the CQI table that is illustrated in FIG. 3, for the subframe (the subframe set) that is not the coordinated subframe.

For example, the base station apparatus notifies the terminal apparatus 103 of the aperiodic CSI request on the first subframe, the control information extraction unit 703 receives the aperiodic CSI request on the first subframe, the information that there is an A-CSI request from the control information extraction unit 703 is input into the CQI determination unit 707, and the CQI determination unit 707 generates the CQI index using the CQI table (for example, FIG. 4) for 256 QAM mode. For example, the base station apparatus notifies the terminal apparatus 103 of the aperiodic CSI request on the second subframe, the control information extraction unit 703 receives the A-CSI request on the second subframe, the information that there is an A-CSI request from the control information extraction unit 703 is input into the CQI determination unit 707, and the CQI determination unit 707 generates the CQI index using the CQI table (for example, FIG. 3) for 64 QAM mode. Moreover, for example, with the RRC signaling, the base station apparatus notifies the terminal apparatus 103 of information indicating the coordinated subframe.

According to the embodiment of the present invention, a two-bit field indispensable for the base station apparatus to make a request to the terminal apparatus 103 for the A-CSI request can be secured in the DCI format (the DCI format 0 or the DCI format 4) that is transmitted on the PDCCH. The two-bit field is hereinafter referred to as the CSI request field. The information as illustrated in FIG. 8 can be transmitted with the two bits. In a case where the 2 bits for the CSI request field is "10" and in a case where the 2 bits for the CSI request field is "11", the terminal apparatus 103 feeds the CSI in one or multiple cells (component carriers, CCs, or serving cells) that are given from the higher layer, back to the base station apparatus. At this point, a configuration in the higher layer in a first set and a second set that are illustrated in FIG. 8 is performed with the RRC signaling.

Figure 16:
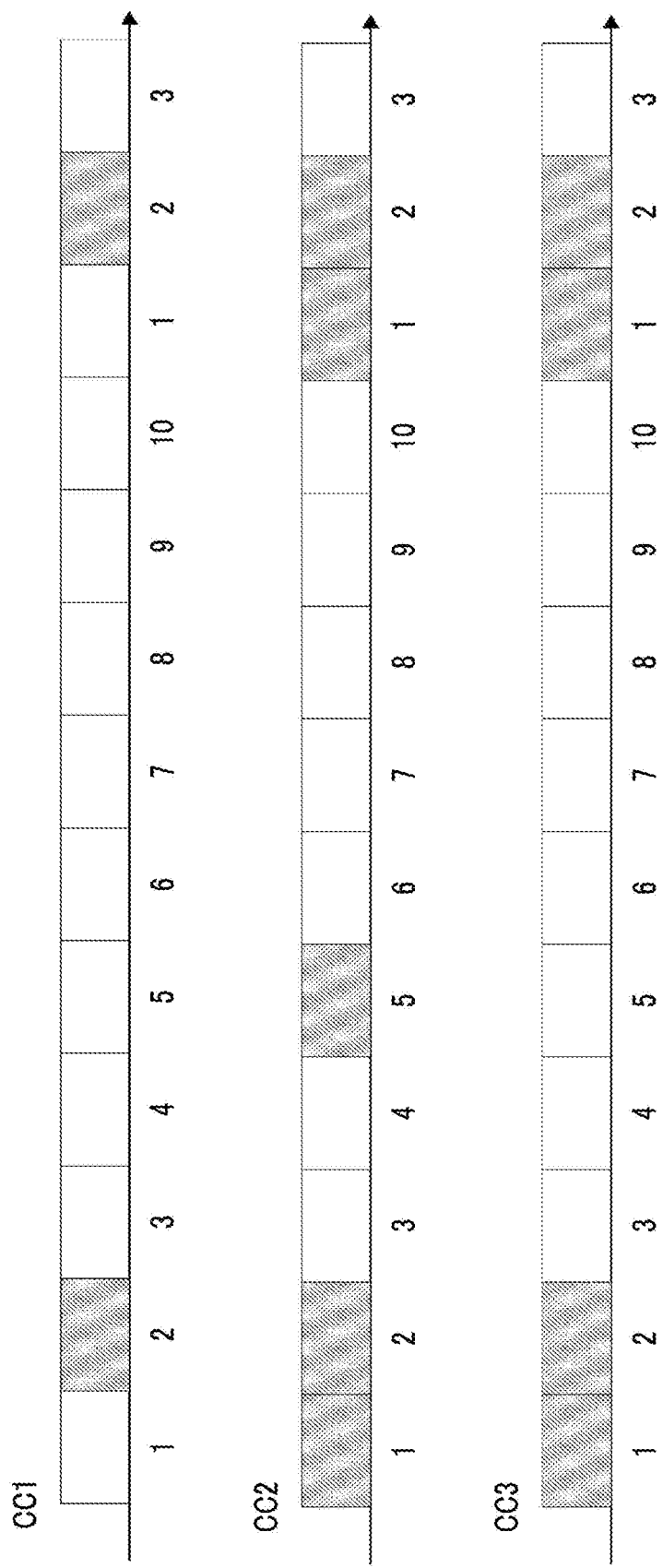
FIG. 16 is a diagram illustrating a subframe on which each carrier component has a high SINR, according to the fifth embodiment.

FIG. 16 illustrates an example of a case where it is possible for the terminal apparatus 103 to use multiple CCs. FIG. 16 illustrates a case where it is possible for the terminal apparatus 103 to use three CCs, that is, CC 1 to CC 3, and illustrates that the second subframe is the coordinated subframe in CC 1, that the first and second subframes and a fifth subframe are the coordinated subframes in CC 2, and that the first and second subframe are the coordinated subframes in CC 3. The coordinated subframe is configured with the RRC signaling or the like for every carrier component. On the coordinated subframe, the ABS is configured in the neighbor base station apparatus. For example, on the second subframe in CC 1, an SINR of a signal that is received by the terminal apparatus 103 is high.

At this point, a case where the two bits for the CSI request field is configured as illustrated in FIG. 17 is considered. A case where the terminal apparatus 103 receives the DCI format that includes the CSI request field on a third subframe for CC 1 is described. In a case where the CSI request field is "00", the terminal apparatus 103 does not feed the CSI back to the base station apparatus. In a case where the CSI request field is "01", the terminal apparatus 103 feeds the CSI in CC 1 back to the base station apparatus using the PUSCH for CC 1. At this point, because the third subframe is not the coordinated subframe in CC 1, the CQI index is calculated with the CQI table for 64 QAM mode. In a case where the CSI request field is "10", the terminal apparatus 103 feeds the CSI in CC 1 to CC 3 back to the base station apparatus using the PUSCH for CC 1. At this point, because the third subframe is not the coordinated subframe in CC 1, the CQI index is calculated for the CQI for CC 1, using the CQI table for 64 QAM mode. At this point, because the third subframe is not the coordinated subframe in CC 2, the CQI index is calculated for the CQI for CC 2, using the CQI table for 64 QAM mode. At this point, because the third subframe is not the coordinated subframe in CC 3, the CQI index is calculated for the CQI for CC 3, using the CQI table for 64 QAM mode. In the case where the CSI field is "11", the terminal apparatus 103 feeds the CSI in CC 1 and CC 3 back to the base station apparatus using the PUSCH for CC 1. At this point, because the third subframe is not the coordinated subframe in CC 1, the CQI index is calculated for the CQI for CC 1, using the CQI table for 64 QAM mode. At this point, because the third subframe is not the coordinated subframe in CC 3, the CQI index is calculated for the CQI for CC 3, using the CQI table for 64 QAM mode.

Next, a case where the terminal apparatus 103 receives the DCI format that includes the CSI request field on the first subframe for CC 1 is described. In the case where the CSI request field is "00", the terminal apparatus 103 does not feed the CSI back to the base station apparatus. In the case where the CSI request field is "01", the terminal apparatus 103 feeds the CSI in CC 1 back to the base station apparatus using the PUSCH for CC 1. At this point, because the first subframe is not the coordinated subframe in CC 1, the CQI index is calculated with the CQI table for 64 QAM mode. In the case where the CSI request field is "10", the terminal apparatus 103 feeds the CSI in CC 1 to CC 3 back to the base station apparatus using the PUSCH for CC 1. At this point, because the first subframe is not the coordinated subframe in CC 1, the CQI index is calculated for the CQI for CC 1, using the CQI table for 64 QAM mode. At this point, because the first subframe is the coordinated subframe in CC 2, the CQI index is calculated for the CQI for CC 2, using the CQI table for 256 QAM mode. At this point, because the first subframe is the coordinated subframe in CC 3, the CQI index is calculated for the CQI for CC 3, using the CQI table for 256 QAM mode. In the case where the CSI request field is "11", the terminal apparatus 103 feeds the CSI in CC 1 and CC 3 back to the base station apparatus using the PUSCH for CC 1. At this point, because the first subframe is not the coordinated subframe in CC 1, the CQI index is calculated for the CQI for CC 1, using the CQI table for 64 QAM mode. At this point, because the first subframe is the coordinated subframe in CC 3, the CQI index is calculated for the CQI for CC 3, using the CQI table for 256 QAM mode.

In this manner, the terminal apparatus 103 performs the transfer using multiple CCs, more precisely, performs carrier aggregation, and even in a case where the coordinated subframe is configured for every CC, according to the embodiment of the present invention, the CQI table is independent of every CC and is selected for every subframe. Consequently, even if the coordinated subframe differs in each CC, the feedback of the CQI that uses a suitable CQI table can be realized.

Furthermore, the modulation mode for every subframe may be implicitly configured without being explicitly configured. For example, 256 QAM mode is configured as the modulation mode with the RRC signaling. Moreover, the first subframe set and the second subframe set are configured with the RRC signaling. At this point, the modulation mode that is set up with the RRC signaling is in advance defined as being configured for the first subframe set. Consequently, 256 QAM mode is applied to the first subframe set, and 64 QAM mode is applied to the second subframe set. Moreover, the modulation mode that is set up with the RRC signaling may be in advance defined as being configured for the second subframe set. In a case where the base station apparatus instructs to the terminal apparatus 103 to use the CQI table for 256 QAM mode, the base station apparatus transmits the DCI format that includes the CSI request field for requesting the feedback of the A-CSI in a downlink subframe which is included in the first subframe set. In a case where the base station apparatus instructs the terminal apparatus 103 to use the CQI table for 64 QAM mode, the base station apparatus transmits the DCI format that includes the CSI request field for requesting the feedback of the A-CSI in the downlink subframe which is included in the second subframe set. In a case where the DCI format is received that includes the CSI request field for requesting the feedback of the A-CSI in the downlink subframe which is included in the first subframe set, the terminal apparatus 103 determines that the CQI table is used for 256 QAM mode. In a case where the DCI format is received that includes the CSI request field for requesting the feedback of the A-CSI in the downlink subframe which is included in the second subframe set, the terminal apparatus 103 determines that the CQI table for 64 QAM mode is used.

[Sixth Embodiment]

According to the fifth embodiment, the example in which one CQI table is selected from among multiple CQI tables based on the timing (the subframe) on which the DCI format including the CSI request field is received and in which the CQI index is generated with the selected CQI table is described as the example of using the CQI table that differs in a prescribed subframe. At this point, with the introduction of 256 QAM, in addition to the CQI table, the MCS table is present as one that assumes that multiple tables are used. According to the present embodiment, a method is described in which the transmission is performed with the MCS that differs with each subframe, without depending on the control information.

The present embodiment, like the fifth embodiment, assumes that the ABSs as illustrated in FIG. 15 are configured in each base station apparatus, and thus communication quality differs with each subframe (or each time resource, such as a radio frame or an OFDM symbol). For example, in FIG. 15, because on the first subframe, the eNB 2 that is the neighbor base station apparatus configures the first subframe as the ABS for the terminal apparatus 103 that makes a connection to the eNB 1, there is a high likelihood that the data transfer will be performed at a high SINR (an SINR that satisfies the quality for 256 QAM). Accordingly, terminal apparatus 103 performs demodulation processing using the MCS table for 256 QAM mode on the subframe set (the coordinated subframe) on which the SINR is high. For example, in FIG. 15, because on the third subframe, the eNB 2 that is the neighbor base station apparatus does not configure the third subframe as the ABS for the terminal apparatus 103 that makes a connection to the eNB 1, there is a high likelihood that the data transfer will not be performed at a high SINR (the SINR that satisfies the quality for 256 QAM). Accordingly, on the subframe set (the subframe that is not the coordinated subframe) on which the SINR is not high, the terminal apparatus 103 performs the demodulating processing using the MCS table for 64 QAM mode.

As with the fifth embodiment, the base station apparatus according to the present embodiment is described referring to FIG. 2. However, because processing by the MCS determination unit 207 is different from that according to the fifth embodiment, only the MCS determination unit 207 is described. The MCS determination unit 207 determines the MCS table that is to be used, using information relating to the modulation mode that is configured from the RRC extraction unit 205. In a case where scheduling information (the allocation information) that is input form the scheduling unit is allocation on the subframe in a coordinated-subframe set, the MCS is determined using the MCS table for 256 QAM mode, and the MCS index is input into the PDSCH generation unit 208 and the control information generation unit 209. At this point, the coordinated-subframe set, for example, is a subframe set on which the SINR is relatively high (or low), in comparison with other subframes. For example, in the case of FIG. 15, because an SINR of the received signal on the first subframe is higher than those of other subframes (for example, the third subframe, a fourth subframe, a sixth subframe, a seventh subframe, an eighth subframe, a ninth subframe, and a tenth subframe), in the terminal apparatus 103 that performs communication with the base station apparatus 1, the first subframe can be the coordinated subframe. On the other hand, because SINRs of the received signals on the second and fifth subframes are higher than those of other subframes (for example, the third subframe, the fourth subframe, the sixth subframe, the seventh subframe, the eighth subframe, the ninth subframe, and the tenth subframe), in the terminal apparatus 103 that performs the communication with the base station apparatus 2, the second and fifth subframes can be the coordinated subframes. Moreover, the coordinated subframe is determined considering configurations of the ABSs between base stations, or the like, and is notified to the terminal apparatus 103 with the RRC signaling or the like. In a case where scheduling information (the allocation information) that is input form the scheduling unit is not allocation on the subframe in a coordinated-subframe set, the MCS is determined using the MCS table for 64 QAM mode, and the MCS index is input into the PDSCH generation unit 208 and the control information generation unit 209.

Next, the constitution of the terminal apparatus 103 according to the present embodiment is described referring to FIG. 7. However, because processing in the control information extraction unit 703 is different from that according to the fifth embodiment, the control information extraction unit 703 is described. The control information extraction unit 703 extracts the MCS index of the data signal that is transmitted on the PDSCH, from the received signal that is input from the reference signal extraction unit 702. However, in a case where the subframe from which the data signal that is transmitted on the PDSCH is extracted is received on the coordinated subframe, the MCS is determined using the MCS table that corresponds to 256 QAM mode and the extracted MCS index, and in a case where the data signal that is transmitted on the PDSCH is received on a subframe other than the coordinated subframe, the MCS is determined using the MCS table that corresponds to 64 QAM mode and the extracted MCS index. The control information extraction unit 703 inputs information relating to the determined MCS into the PDSCH demodulation unit 704, and with the determined MCS, the PDSCH demodulation unit 704 performs the demodulation.

Moreover, the case where the reception quality on the coordinated subframe is higher than those on other subframes is described above, but no limitation to this is imposed. For example, the base station apparatus may notify the terminal apparatus 103 of the subframe on which the SINR is low, as the coordinated subframe. In a case where the PDCCH that is destined for the terminal apparatus 103 itself is received on the coordinated subframe, the terminal apparatus 103 may determine the MCS that is applied to the PDSCH, using the MCS table that corresponds to 64 QAM mode and the extracted MCS index. In a case where the PDCCH that is destined for the terminal apparatus 103 itself is received on a subframe other than the coordinated subframe, the terminal apparatus 103 may determine the MCS that is applied to the PDSCH, using the MCS table that corresponds to 256 QAM mode and the extracted MCS index.

In this manner, according to the present embodiment, without frequently changing the modulation mode with the RRC signaling, 256 QAM mode can applied to a prescribed subframe, the high-SINR reception on which can be expected, and 64 QAM mode can be applied to a prescribed subframe, the low-SINR reception on which is expected. As a result, without increasing the overhead associated with the control information, the data throughput of the terminal apparatus 103 can be increased.

[Seventh Embodiment]

According to the fifth embodiment, the example in which one CQI table is selected from among multiple CQI tables based on the timing (the subframe) at which the DCI format including the CSI request field and in which the CQI index is generated (selected, judged, or determined) using the selected CQI table is described as the example of calculating the CQI index using the CQI table different from those on other subframes at the time of the calculation of the CQI on a prescribed subframe. However, the embodiment of the present invention in which the CQI table different from those on other subframes is used on a prescribed subframe, which is disclosed, is not limited to the example described above. According to the present embodiment, a method is described in which different CQI tables are used when on a prescribed subframe, the Periodic CSI (P-CSI) is reporting.

According to the present embodiment, the periodic CSI reporting in which the CSI is reported to the base station apparatus with a period that is configured with the RRC signaling is used. In the periodic CSI, the first subframe set (the first subframe set for the downlink) and the second subframe set (the second subframe set for the downlink) are configured with the RRC signaling for the terminal apparatus 103, the terminal apparatus 103 calculates the CQI on each of the subframe sets, the terminal apparatus 103 reports the CQI indexes (the CQI index for the first subframe set and the CQI index for the second subframe set) that are determined based on the CQI table, to the base station apparatus at different timings (on different subframes). Moreover, the timings at which the reporting is performed are given different time offsets. FIG. 18 illustrates one example of the periodic CSI reporting. In FIG. 18, the first subframe for the downlink and the third subframe for the downlink are configured as the first subframe set, and the second subframe for the downlink and the fourth to tenth subframes for the downlink are configured as the second subframe set. The terminal apparatus 103 calculates the CQI on each of the first subframe set and the second subframe set, and reports each of the CQI indexes to the base station apparatus. At this point, the periodic CSI reporting on the first subframe set and the periodic CSI reporting on the second subframe set are performed at different timings (on the uplink subframe and the subframe). In FIG. 18, a case where the periodic CSI reporting on the first subframe set and the periodic CSI reporting on the second subframe set are both performed at intervals of 5 ms (5 subframes), the periodic CSI reporting on the first subframe set is performed on the second subframe for the uplink and the seventh subframe for the uplink (the first subframe set for the uplink), and the periodic CSI reporting on the second subframe set is performed on the fourth subframe for the uplink and the ninth subframe for the uplink (the second subframe set for the uplink).

Different CQI tables are used for the periodic CSI reporting on the first subframe set and the periodic CSI reporting on the second subframe set. The CQI table is selected based on the modulation mode that is configured for each of the first subframe set and the second subframe set. The modulation mode for each of the subframe sets is configured using the RRC signaling. For example, 256 QAM mode is applied to the first subframe set, and 64 QAM mode is applied to the second subframe set. For the periodic CSI reporting on the subframe set for which 256 QAM mode is configured, the CQI table that is illustrated in FIG. 4 is used. For the periodic CSI reporting on the subframe set for which 64 QAM mode is configured, the CQI table that is illustrated in FIG. 3 is used. A first periodic CSI report on the first subframe set for the downlink is generated based on the CQI table that includes 256 QAM, the first periodic CSI report is transmitted on the first subframe set for the uplink. A second periodic CSI report on the second subframe set for the downlink is generated based on the CQI table that does not include 256 QAM, and the second periodic CSI report is transmitted on the second subframe set for the uplink.

In a case where multiple subframe sets are present, in the channel estimator 706, the channel estimate is calculated for every subframe set and the calculated channel estimate is input into the CQI determination unit 707. Moreover, as with the fifth embodiment, the channel estimate is also input into the control information extraction unit 703 and the PDSCH demodulation unit 704. In the CQI determination unit 707, the CQI table that is used for the calculation of the CQI index is changed, depending on modulation mode configuration information that is input from the RRC configuration unit 708, and on whether the subframe set on which the CQI index is calculated is a prescribed subframe set (for example, the first subframe set) or a subframe set (for example, the second subframe set) other than the prescribed subframe set. The CQI index that is calculated with the CQI table that is used is input into the PUCCH generation unit 709 or the PUSCH generation unit 710, and is notified on a prescribed uplink subframe to the base station apparatus.

According to the present embodiment, a case is described where, when the terminal apparatus 103 feeds the Periodic CSI (P-CSI) back to the base station apparatus, in a case where the CQI index is calculated every multiple subframe sets, the CQI index is calculated with the CQI table for the modulation mode that differs with each subframe set. A likelihood that the suitable MCS will be selected can be increased by employing the configuration that is described according to the present embodiment, because, when the data transfer on a channel that has the reception quality which temporally differs is performed, the CQI table suitable for the reception quality can be used. As a result, the throughput of the downlink can be increased.

Combinations of all or some of the embodiments described above are included in the present invention. Furthermore, the case where multiple CQI tables or the MCS table is present for the downlink, but application to a case where multiple CQI tables or the MCS table is present on the uplink is also possible.

A program running on the base station and the terminal according to the present invention is a program (a program for causing a computer to operate) that controls a CPU and the like in such a manner as to realize the function according to the embodiments of the present invention, which are described above. Then, pieces of information that are handled in the apparatuses are temporarily accumulated in a RAM while being processed. Thereafter, the pieces of information are stored in various ROMs or HDDs, and when the need arises, is read by the CPU to be modified or written. Of a semiconductor medium (for example, a ROM, a nonvolatile memory card, or the like), an optical storage medium (for example, a DVD, an MO, an MD, a CD, a BD, or the like), a magnetic storage medium (for example, a magnetic tape, a flexible disk, or the like), and the like, any one may be possible as a recording medium on which to store the program. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where the programs are distributed on the market, the programs, each of which is stored on a portable recording medium, can be distributed, or can be transmitted to a server computer that is connected through a network such as the Internet. In this case, a storage device of the server computer is also included in the present invention. Furthermore, some and all of the portions of the base station and the terminal to the embodiments described above may be realized as an LSI that is a typical integrated circuit. Each functional block of the base station and the terminal may be individually built into a chip, and some or all functional blocks may be integrated into a chip. Furthermore, a circuit integration technique is not limited to the LSI, and an integrated circuit for the functional block may be realized as a dedicated circuit or a general-purpose processor. In a case where each functional block is integrated into a circuit, an integrated circuit control unit is added that controls these functional blocks.

Furthermore, a circuit integration technique is not limited to the LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, the invention in the present application is not limited to the embodiments described above. Furthermore, application of the terminal according to the invention in the present application is not limited to a mobile station apparatus. It goes without saying that the terminal can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific constitution is not limited to the embodiments and also includes an amendment to a design and the like that fall within the scope that does not depart from the gist of the present invention. Furthermore, various modifications are possible within the scope of the present invention defined by claims, and embodiments that are made by suitably combining technical means that are disclosed according to the different embodiments are also included in the technical scope of the present invention. Furthermore, a configuration in which a constituent element that achieves the same effect is substituted for the one that is described according to each of the embodiments described above is also included in the technical scope of the present invention.

INDUSTRIAL APPLICABILITY

The present invention is suitable for use in a wireless base station, a wireless terminal, a wireless communication system, or a wireless communication method.

Moreover, the present international application claims the benefits of Japanese Patent Application Nos. 2013-270703 and 2014-016279 filed on Dec. 27, 2013 and Jan. 31, 2014, respectively, the entire contents of each of which are incorporated herein by reference.

REFERENCE SIGNS LIST

101 MACRO BASE STATION APPARATUS
102 PICO BASE STATION APPARATUS

103 TERMINAL APPARATUS
201 RECEIVE ANTENNA
202 UL RECEPTION UNIT
203 CONTROL INFORMATION EXTRACTION UNIT
204 CQI EXTRACTION UNIT
205 RRC EXTRACTION UNIT
206 SCHEDULING UNIT
207 MCS DETERMINATION UNIT
208 PDSCH GENERATION UNIT
209 CONTROL INFORMATION GENERATION UNIT
210 RRC GENERATION UNIT
211 DL TRANSMISSION UNIT
212 TRANSMIT ANTENNA
700 RECEIVE ANTENNA
701 DL RECEPTION UNIT
702 REFERENCE SIGNAL EXTRACTION UNIT
703 CONTROL INFORMATION EXTRACTION UNIT
704 PDSCH DEMODULATION UNIT
705 RRC EXTRACTION UNIT
706 CHANNEL ESTIMATOR
707 CQI DETERMINATION UNIT
708 RRC CONFIGURATION UNIT
709 PUCCH GENERATION UNIT
710 PUSCH GENERATION UNIT
711 UL TRANSMISSION UNIT
712 TRANSMIT ANTENNA

The invention claimed is:

1. A terminal apparatus configured to communicate with a base station apparatus, the terminal apparatus comprising:
receive circuitry;
transmit circuitry;
a processor; and
a memory associated with the processor; wherein
the receive circuitry receives from the base station apparatus, a Radio Resource Control (RRC) signaling which includes first setting information indicating applicability of an alternative CQI (Channel Quality Information) table among a CQI table and the alternative CQI table, and a Physical Downlink Shared CHannel (PDSCH),
the transmit circuitry reports CQI according to the alternative CQI table for a corresponding CSI subframe set configured by the first setting information which is received by the receive circuitry, in a case that the first setting information indicates a first CSI subframe set, not a second CSI subframe set, and
the RRC signaling includes second setting information indicating the CQI table among the CQI table and the alternative CQI table,
both of the first setting information and the second setting information include one of the first CSI subframe set and the second CSI subframe set in a radio frame.

2. The terminal apparatus according to claim 1, wherein the CQI table includes at least information corresponding to a first modulation scheme,
the first modulation scheme includes QPSK, 16 QAM, and 64 QAM,
the alternative CQI table includes at least information corresponding to a second modulation scheme, and
the second modulation scheme includes QPSK, 16 QAM, 64 QAM, and 256 QAM.

3. The terminal apparatus according to claim 1, wherein the CQI is given in the alternative CQI table for reporting CQI based on QPSK, 16 QAM, 64 QAM and 256 QAM.

4. The terminal apparatus according to claim 1, wherein the first CSI subframe set and the second CSI subframe set are one or a plurality of subframes within a radio frame.

5. The terminal apparatus according to claim 1, wherein the transmit circuitry reports CQI for the second CSI subframe set according to the CQI table.

6. The terminal apparatus according to claim 1, wherein the first setting information indicates that the alternative CQI table applies to CSI processes.

7. The terminal apparatus according to claim 1, further comprising:
PDSCH demodulation circuitry that performs demodulation of the PDSCH, wherein
the receive circuitry receives, from the base station apparatus, a PDCCH (Physical Downlink Control CHannel) or an EPDCCH (Enhanced Physical Downlink Control CHannel),
the PDCCH or the EPDCCH includes a MCS (Modulation and Coding Scheme) index and the PDSCH demodulation circuitry uses PDSCH demodulation to determine a modulation scheme used in the PDSCH, the MCS index, and a first MCS table with respect to the first MCS table and a second MCS table, in a case that the first setting information is configured,
the first MCS table includes at least information corresponding to a third modulation scheme,
the third modulation scheme includes QPSK, 16 QAM, 64 QAM, and 256 QAM,
the second MCS table includes at least information corresponding to a fourth modulation scheme, and
the fourth modulation scheme includes QPSK, 16 QAM, and 64 QAM.

8. A base station apparatus configured to communicate with a terminal apparatus, the base station apparatus comprising:
receive circuitry;
transmit circuitry;
a processor; and
a memory associated with the processor; wherein
the transmit circuitry transmits, to the terminal apparatus, a Radio Resource Control (RRC) signaling which includes first setting information indicating applicability of an alternative CQI (Channel Quality Information) table among a CQI table and the alternative CQI table, and a PDSCH (Physical Downlink Shared CHannel),
the receive circuitry receives CQI according to the alternative CQI table for a corresponding CSI subframe set configured by the first setting information, in a case that the first setting information, which is transmitted by the transmit circuitry, indicates a first CSI subframe set, not a second CSI subframe set, and
the RRC signaling includes second setting information indicating the CQI table among the CQI table and the alternative CQI table,
both of the first setting information and the second setting information include one of the first CSI subframe set and the second CSI subframe set in a radio frame.

9. The base station apparatus according to claim 8, wherein
the CQI table includes at least information corresponding to a first modulation scheme,
the first modulation scheme includes QPSK, 16 QAM, and 64 QAM,
the alternative CQI table includes at least information corresponding to a second modulation scheme, and
the second modulation scheme includes QPSK, 16 QAM, 64 QAM, and 256 QAM.

10. The base station apparatus according to claim 8, further comprising:

PDSCH modulation circuitry that performs modulation of the PDSCH, wherein the transmit circuitry transmits, to the terminal apparatus, a PDCCH (Physical Downlink Control CHannel) or an EPDCCH (Enhanced Physical Downlink Control CHannel), the PDCCH or the EPDCCH includes a MCS (Modulation and Coding Scheme) index, and the PDSCH modulation circuitry uses PDSCH demodulation to determine a modulation scheme used in the PDSCH, the MCS index and a first MCS table with respect to the first MCS table and a second MCS table, in a case that the first setting information is configured, the first MCS table includes at least information corresponding to a third modulation scheme, the third modulation scheme includes QPSK, 16 QAM, 64 QAM, and 256 QAM, the second MCS table includes at least information corresponding to a fourth modulation scheme, and the fourth modulation scheme includes QPSK, 16 QAM, and 64 QAM.

11. A method executed by a terminal apparatus that communicates with a base station apparatus, the method comprising:

a step of receiving, from the base station apparatus, a Radio Resource Control (RRC) signaling which includes first setting information indicating applicability of an alternative CQI (Channel Quality Information) table among a CQI table and the alternative CQI table, and a PDSCH (Physical Downlink Shared CHannel), and a step of reporting CQI according to the alternative CQI table for a corresponding CSI subframe set configured by the first setting information, in a case that the first setting information, which is received, indicates a first CSI subframe set, not a second CSI subframe set, wherein the RRC signaling includes second setting information indicating the CQI table among the CQI table and the alternative CQI table, both of the first setting information and the second setting information include one of the first CSI subframe set and the second CSI subframe set in a radio frame.

12. A method executed by a base station apparatus that communicates with a terminal apparatus, the method comprising:

a step of transmitting, to the terminal apparatus, a Radio Resource Control (RRC) signaling which includes first setting information indicating applicability of an alternative CQI (Channel Quality Information) table among a CQI table and the alternative CQI table, and a PDSCH (Physical Downlink Shared CHannel), and a step receiving CQI according to the alternative CQI table for a corresponding CSI subframe set configured by the first setting information, in a case that the first setting information, which is transmitted, indicates a first CSI subframe set, not a second CSI subframe set, wherein the RRC signaling includes second setting information indicating the CQI table among the CQI table and the alternative CQI table, both of the first setting information and the second setting information include one of the first CSI subframe set and the second CSI subframe set in a radio frame.

* * * * *